(12) United States Patent
Fujita et al.

(10) Patent No.: US 12,112,408 B2
(45) Date of Patent: Oct. 8, 2024

(54) VEHICLE DISPLAY CONTROL DEVICE, VEHICLE DISPLAY DEVICE, VEHICLE DISPLAY CONTROL METHOD, AND NON-TRANSITORY STORAGE MEDIUM

(71) Applicant: TOYOTA JIDOSHA KABUSHIKI KAISHA, Toyota (JP)

(72) Inventors: Eriko Fujita, Anjyo (JP); Hitoshi Kumon, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/812,604

(22) Filed: Jul. 14, 2022

(65) Prior Publication Data

US 2023/0022485 A1   Jan. 26, 2023

(30) Foreign Application Priority Data

Jul. 26, 2021   (JP) ................................. 2021-122023

(51) Int. Cl.
```
G09G 3/36        (2006.01)
G02B 27/01       (2006.01)
G06T 11/20       (2006.01)
G09G 3/00        (2006.01)
B60K 35/00       (2006.01)
```
(Continued)

(52) U.S. Cl.
CPC ........ *G06T 11/203* (2013.01); *G02B 27/0101* (2013.01); *G09G 3/002* (2013.01); *B60K 35/00* (2013.01); *B60K 35/28* (2024.01); *B60K 35/81* (2024.01); *B60K 2360/168* (2024.01); *G02B 2027/0141* (2013.01); *G06V 20/588* (2022.01); *G09G 2380/10* (2013.01)

(58) Field of Classification Search
CPC .. G06T 11/203; G02B 27/0101; G09G 3/002; B60K 2370/168
USPC .......................................................... 345/93
See application file for complete search history.

(56) References Cited

U.S. PATENT DOCUMENTS

2007/0106475 A1 * 5/2007 Kondoh ................. G06V 20/58
                                                                340/436
2017/0146796 A1   5/2017 Kosaka et al.
(Continued)

FOREIGN PATENT DOCUMENTS

JP      5327182 B2    10/2013
JP      2016-2779 A    1/2016
(Continued)

*Primary Examiner* — Jonathan M Blancha
(74) *Attorney, Agent, or Firm* — Oblon, McClelland, Maier & Neustadt, L.L.P.

(57) ABSTRACT

A vehicle display control device includes a memory and a processor coupled to the memory. The vehicle display control device is configured such that the processor controls a vehicle display device for displaying an image on a display region so as to be superimposed on a portion of a view ahead of a vehicle. The processor is configured so as to detect a preceding vehicle traveling at a vehicle front side of a host vehicle, and in cases in which the preceding vehicle has been detected, causes an image that includes a plurality of inter-vehicle marker objects from the host vehicle side toward the preceding vehicle side to be displayed in the display region, and causes sequential emphasis display of the plurality of inter-vehicle marker objects in sequence from the host vehicle side toward the preceding vehicle side.

16 Claims, 16 Drawing Sheets

(51) Int. Cl.
    *B60K 35/28*     (2024.01)
    *B60K 35/81*     (2024.01)
    *G06V 20/56*     (2022.01)

(56) References Cited

U.S. PATENT DOCUMENTS

| | | | |
|---|---|---|---|
| 2017/0161009 A1* | 6/2017 | Ogisu | G02B 27/0101 |
| 2018/0023970 A1* | 1/2018 | Iguchi | G08G 1/096861 |
| | | | 345/7 |
| 2018/0218713 A1 | 8/2018 | Kusanagi et al. | |
| 2018/0240258 A1 | 8/2018 | Kosaka et al. | |
| 2018/0257489 A1 | 9/2018 | Watanabe et al. | |
| 2018/0286094 A1* | 10/2018 | Shishido | G02B 27/0101 |
| 2018/0299286 A1 | 10/2018 | Iguchi | |
| 2018/0306597 A1 | 10/2018 | Kosaka et al. | |
| 2019/0120646 A1 | 4/2019 | Iguchi | |
| 2020/0114933 A1* | 4/2020 | Ono | B60W 30/18009 |
| 2021/0302727 A1* | 9/2021 | Sugiyama | G02B 27/0179 |

FOREIGN PATENT DOCUMENTS

| | | |
|---|---|---|
| JP | 2016-070747 A | 5/2016 |
| JP | 2017-21019 A | 1/2017 |
| JP | 6278222 B2 | 2/2018 |
| JP | 6384138 B2 | 9/2018 |
| JP | 6443559 B2 | 1/2019 |
| JP | 6536855 B2 | 7/2019 |
| JP | 6540817 B2 | 7/2019 |
| JP | 6562079 B2 | 8/2019 |
| WO | 2016/009628 A1 | 1/2016 |
| WO | WO 2017/056157 A1 | 4/2017 |
| WO | WO 2022/209439 A1 | 10/2022 |

* cited by examiner

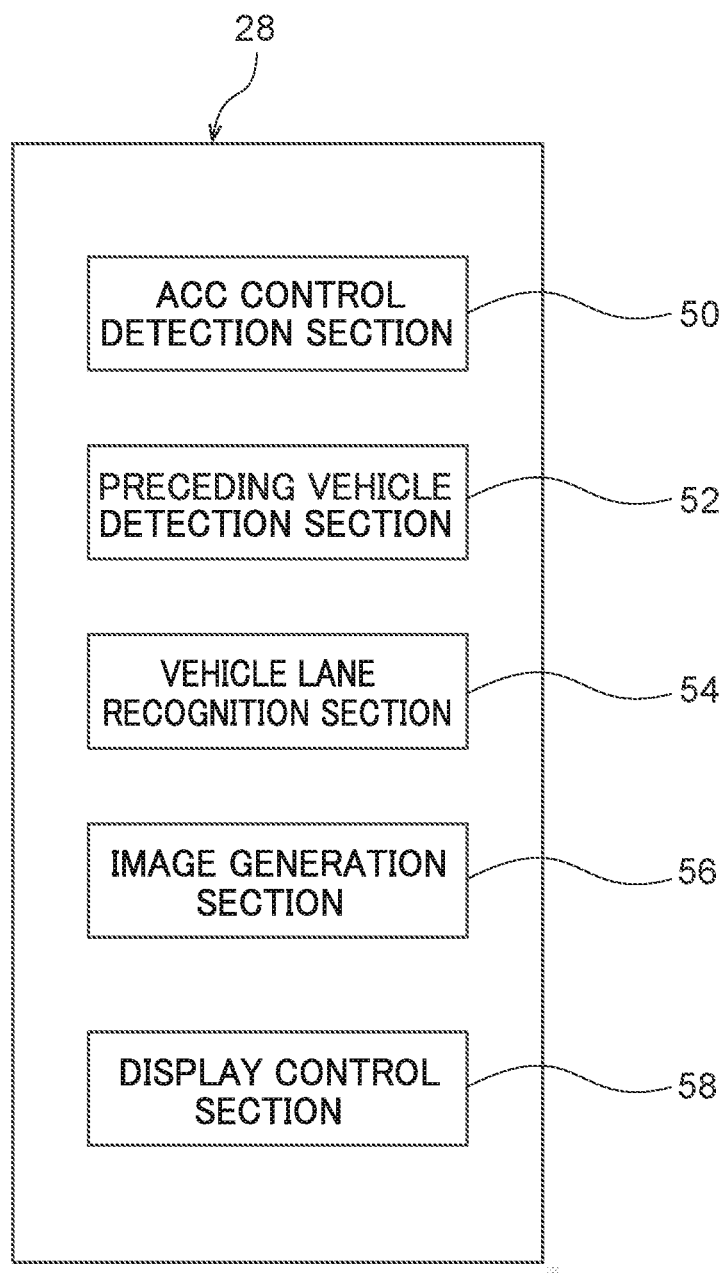

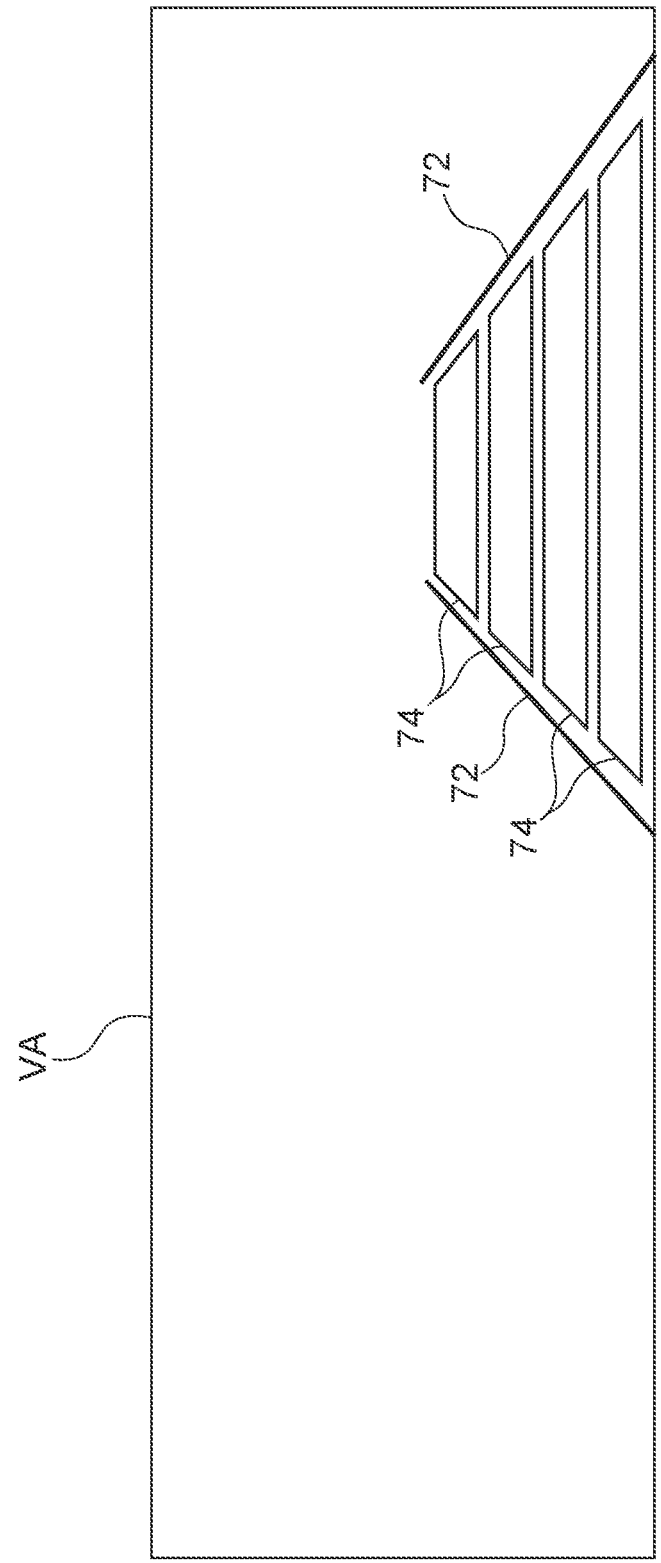

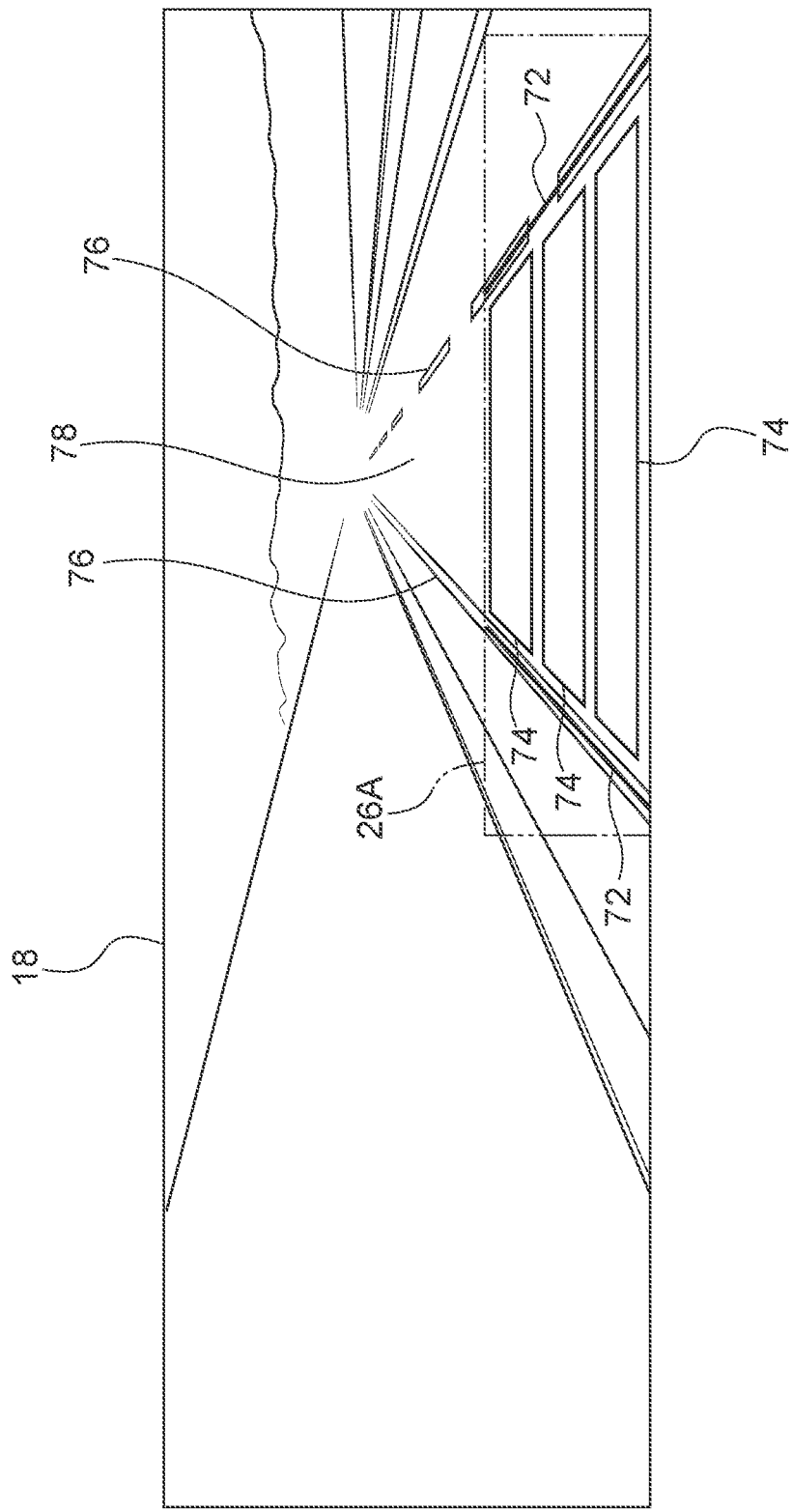

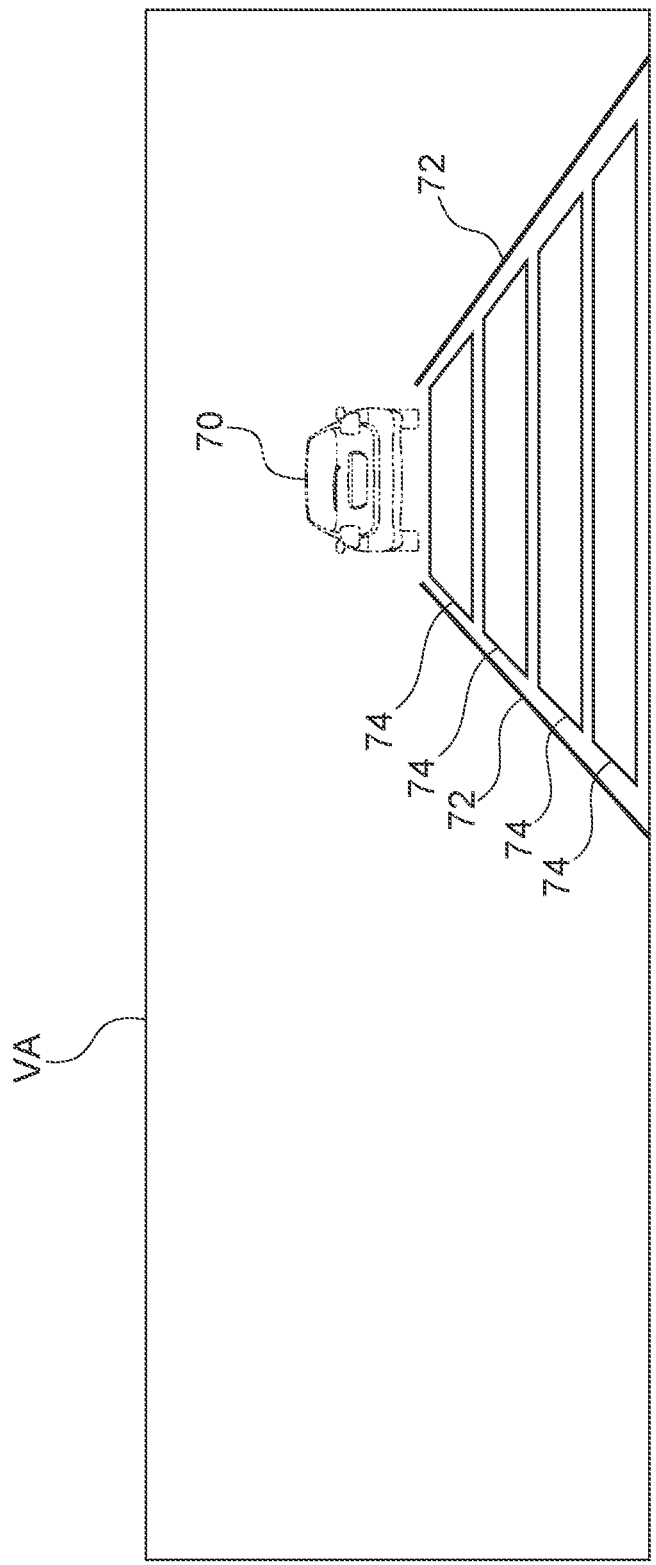

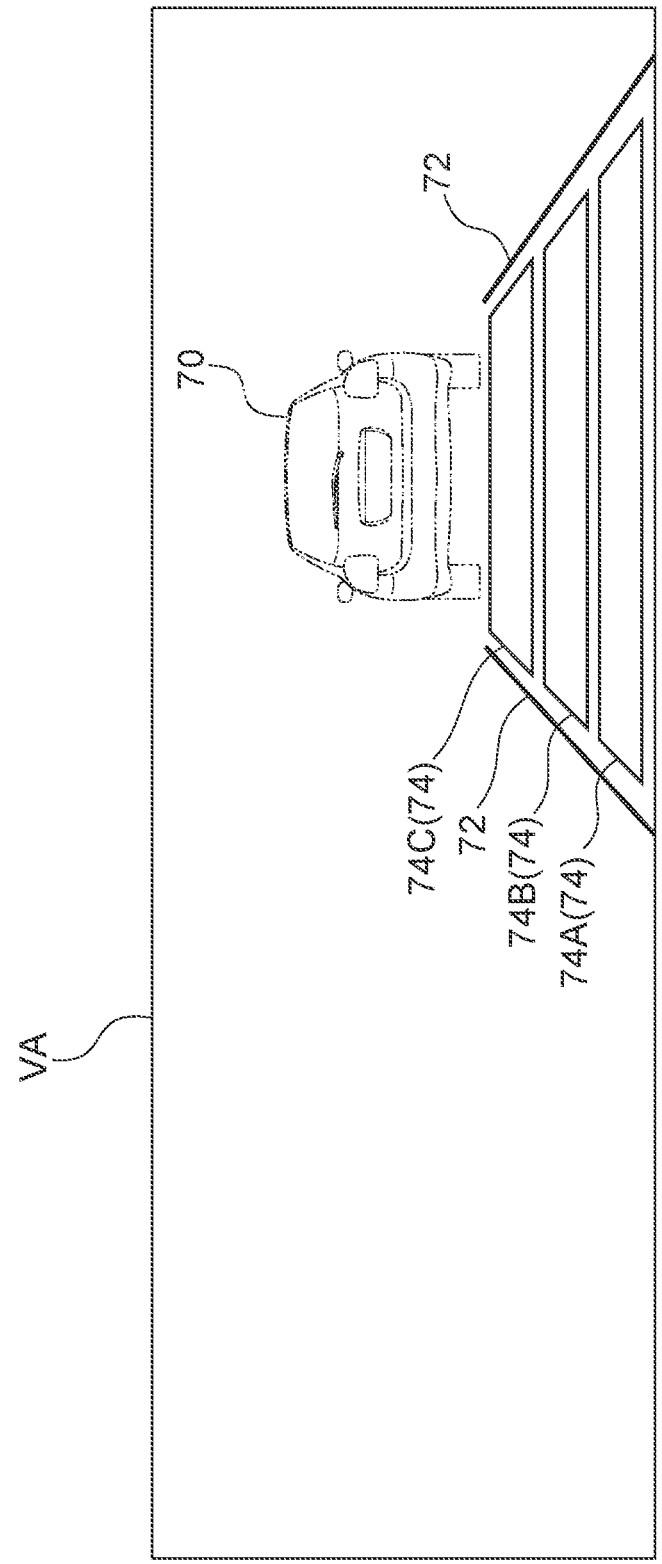

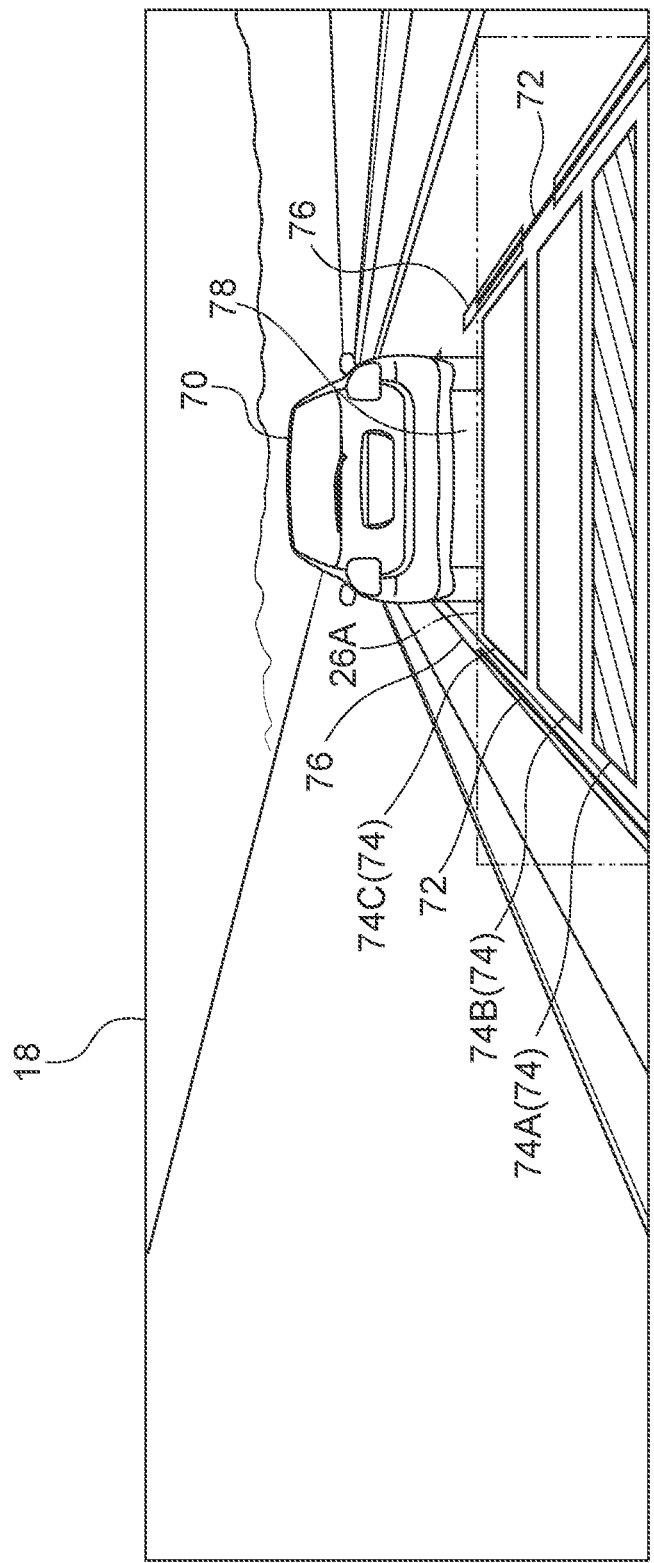

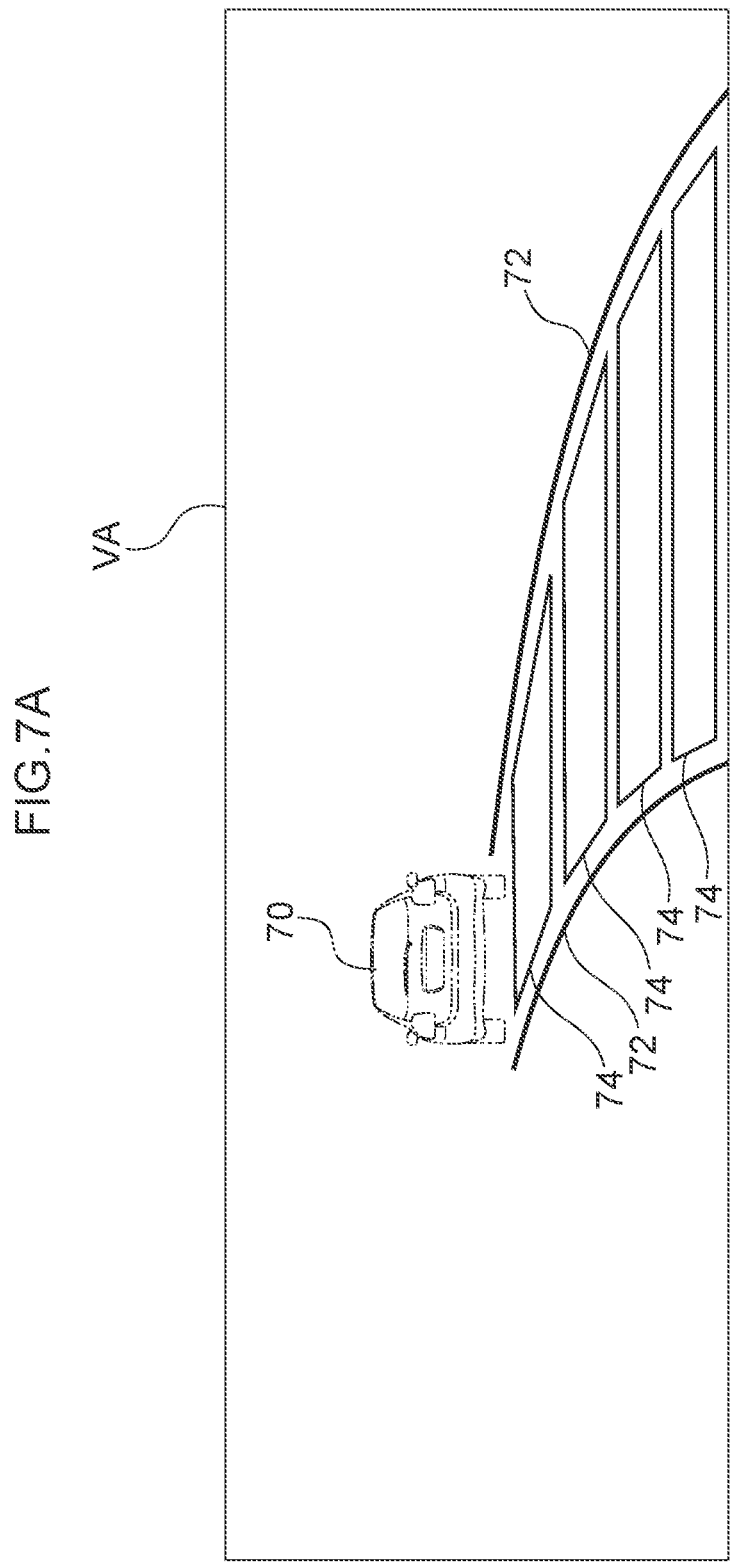

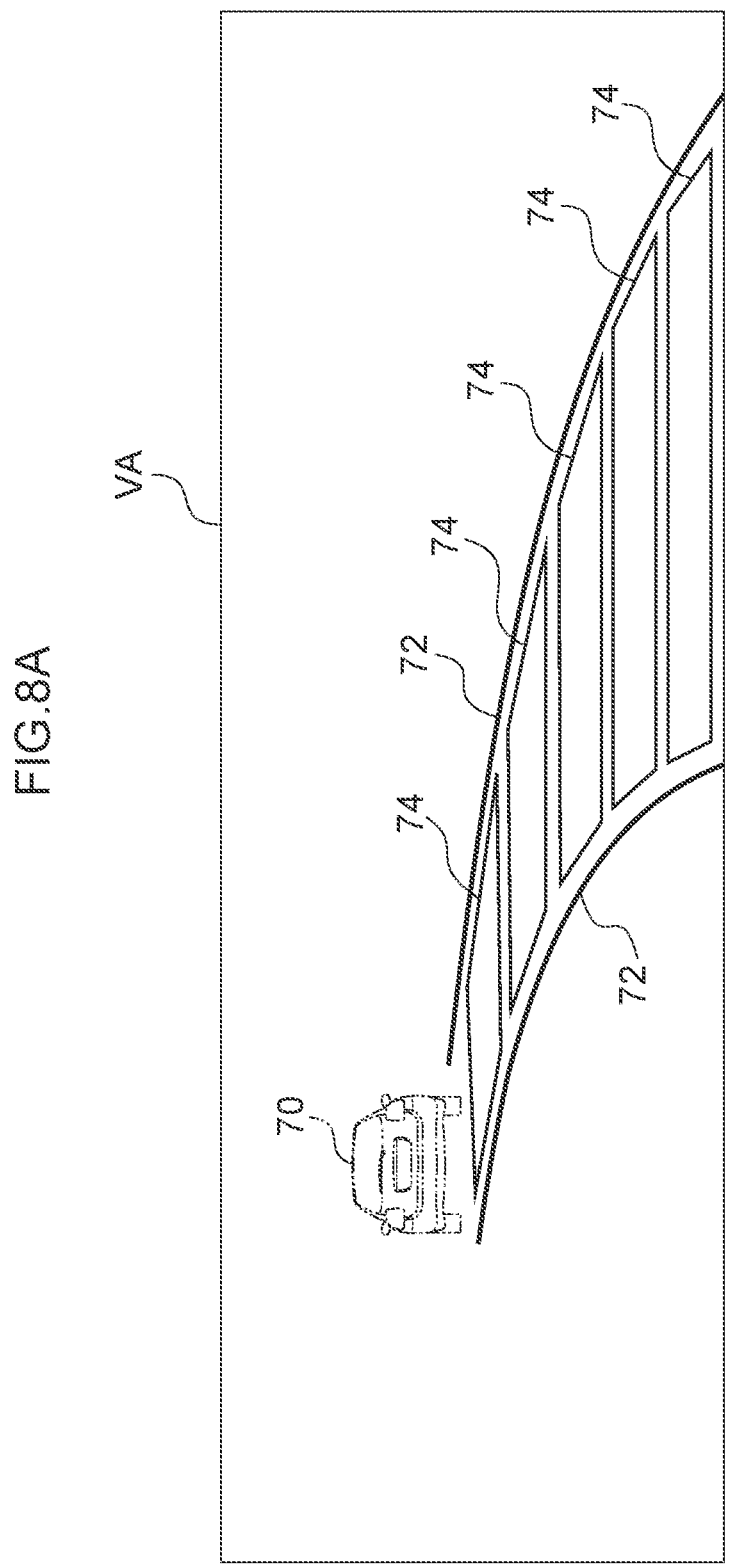

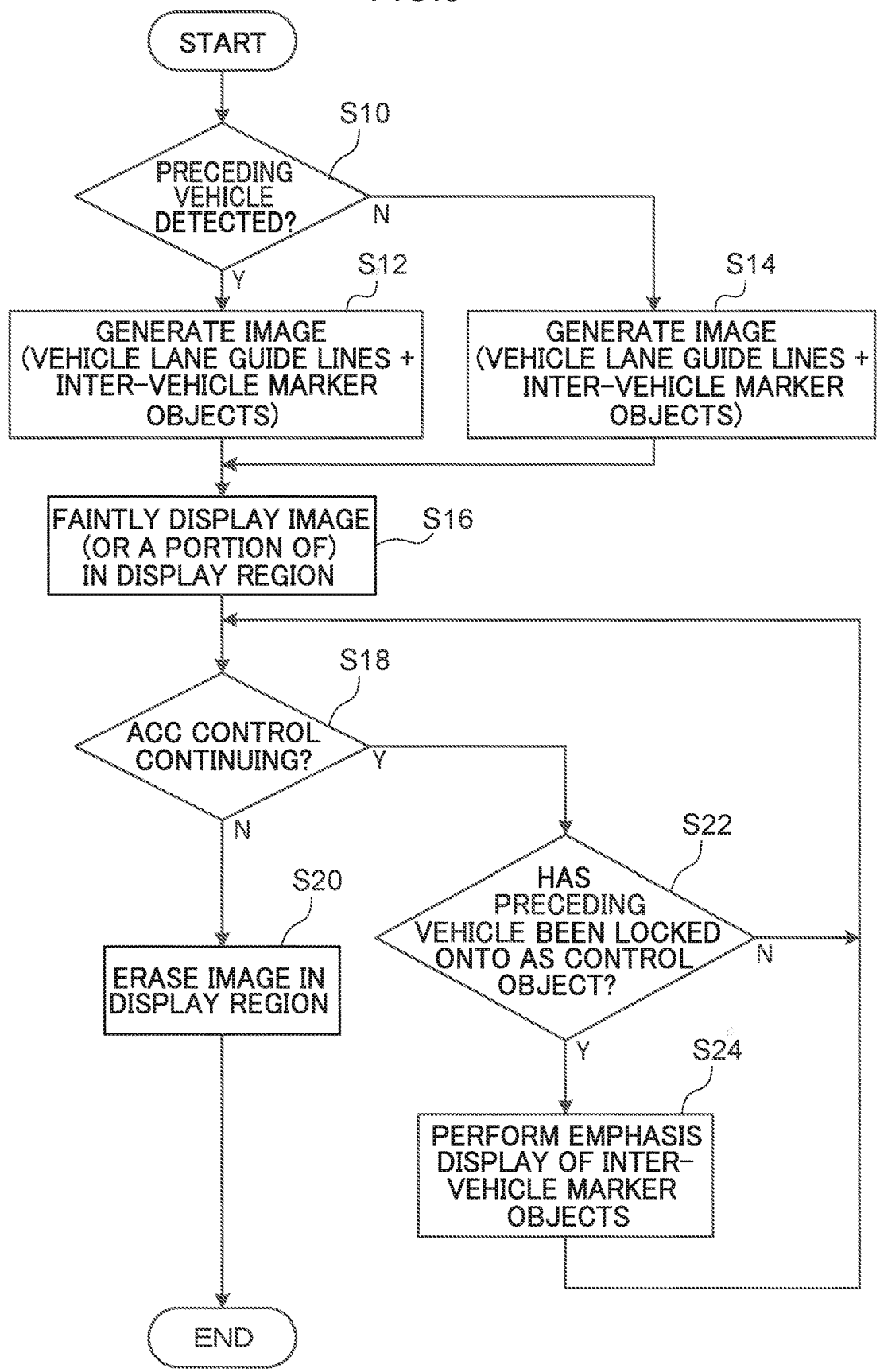

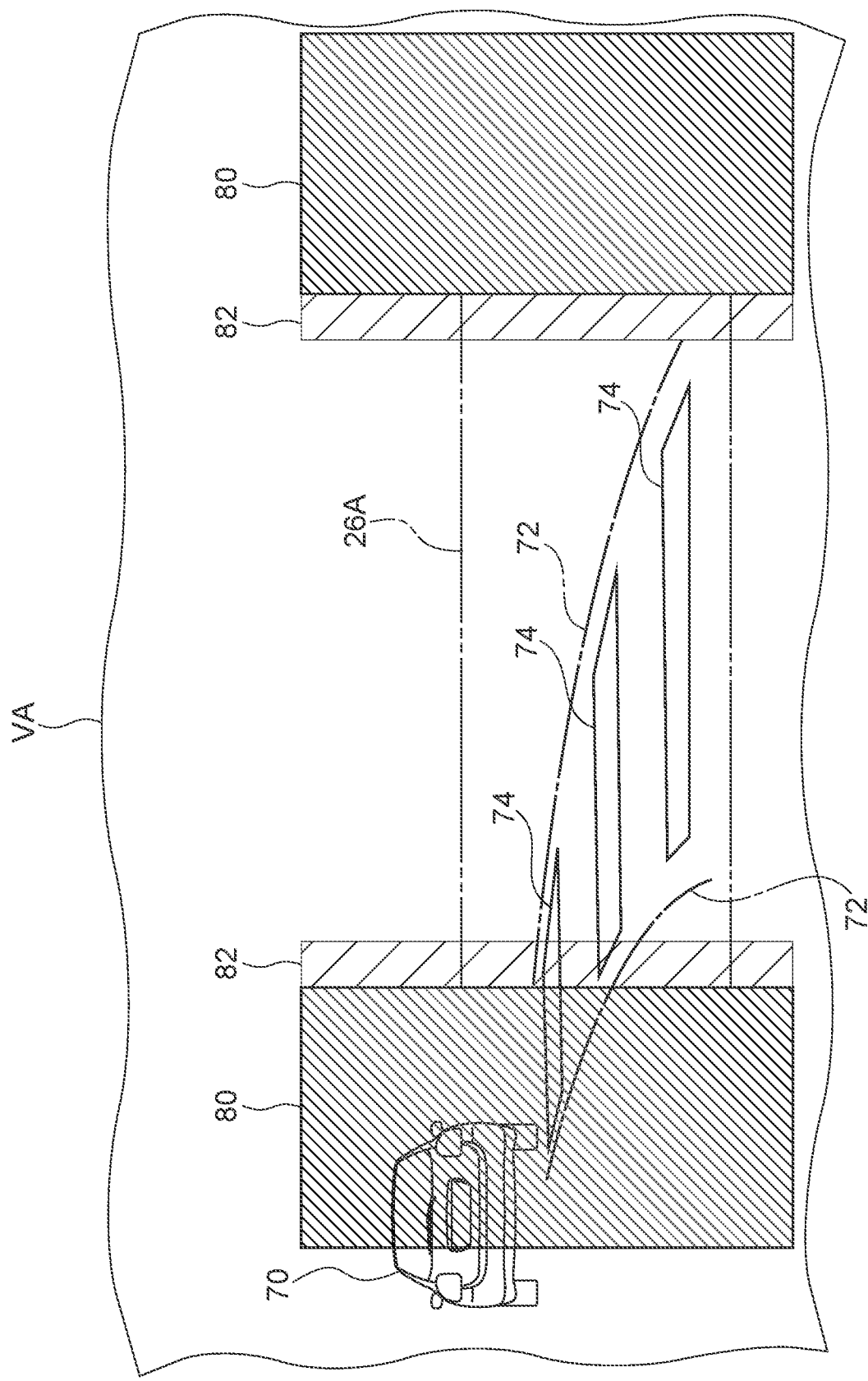

VEHICLE DISPLAY CONTROL DEVICE, VEHICLE DISPLAY DEVICE, VEHICLE DISPLAY CONTROL METHOD, AND NON-TRANSITORY STORAGE MEDIUM

CROSS-REFERENCE TO RELATED APPLICATION

This application is based on and claims priority under 35 USC 119 from Japanese Patent Application No. 2021-122023 filed on Jul. 26, 2021, the disclosure of which is incorporated by reference herein.

BACKGROUND

Technical Field

The present disclosure relates to a vehicle display control device, a vehicle display device, a vehicle display control method, and a non-transitory storage medium on which is stored a vehicle display control program.

Related Art

There are proposals to display whether or not adaptive cruise control (ACC) is operating on a vehicle windshield by employing an augmented reality-head up display (AR-HUD). For example, in a proposal in International Publication (WO) No. 2017/056157, a marker extending along a vehicle width direction is displayed using AR-HUD at a lower portion of a preceding vehicle visible through the windshield, the preceding vehicle being a control object during following-travel control while under ACC control.

In cases in which the preceding vehicle visible through the windshield falls outside the AR-HUD display region at the vehicle width direction outside, that ACC (following-travel) control is continuing is indicated by displaying a dot or the like at the vehicle width direction outside edge of the display region, instead of the marker described above.

Due to the technology disclosed in WO No. 2017/056157 switching the display method of the marker using the AR-HUD by whether or not the preceding vehicle is positioned within the display region, there is a need to determine whether or not the preceding vehicle is positioned within the display region.

Moreover, even in cases in which a dot or the like is displayed at the vehicle width direction outside edge of the display region, the preceding vehicle visible through the windshield and the dot or the like are separated from each other, and an occupant in the driving seat sometimes finds it difficult to know intuitively whether or not ACC (following-travel) control is in operation.

Similarly to such ACC control cases, in cases in which information related to a preceding vehicle is displayed in a display region, in cases in which the preceding vehicle visible through the windshield falls outside the display region of the AR-HUD, an occupant in the driving seat sometimes finds it difficult to intuitively know such information is related to the preceding vehicle even when the information (an image) is visible.

SUMMARY

The present disclosure provides a vehicle display control device, a vehicle display device, a vehicle display control method, and a vehicle display control program that display an image in a display region such that information related to a preceding vehicle is easily confirmed intuitively by an occupant using simple display control, irrespective of whether or not the preceding vehicle is positioned inside a display region.

A vehicle display control device according to a first aspect of the present disclosure is a vehicle display control device to control a vehicle display device for displaying an image on a display region so as to be superimposed on a portion of a view ahead of a vehicle. The vehicle display control device includes a preceding vehicle detection section configured to detect a preceding vehicle traveling at a vehicle front side of a host vehicle and a display control section. The display control section is configured to, in cases in which the preceding vehicle has been detected by the preceding vehicle detection section, cause an image that includes plural inter-vehicle marker objects from the host vehicle side toward the preceding vehicle side to be displayed in the display region, and cause sequential emphasis display of the plural inter-vehicle marker objects in sequence from the host vehicle side toward the preceding vehicle side.

In the first aspect, the vehicle display control device detects a preceding vehicle with the preceding vehicle detection section, and uses the display control section to display an image that includes the plural inter-vehicle marker objects from the host vehicle side toward the preceding vehicle side in the display region so as to be superimposed on a portion of a view ahead of a vehicle, and to perform sequential emphasis display of the plural inter-vehicle marker objects in sequence from the host vehicle side toward the preceding vehicle side.

A driving seat occupant is thereby able to intuitively be aware of information related to the preceding vehicle due to the plural inter-vehicle marker objects displayed toward the preceding vehicle side being subjected to sequential emphasis display toward the preceding vehicle side.

Moreover, even in cases in which the preceding vehicle in the view ahead falls outside the display region, the plural inter-vehicle marker objects are still displayed from the host vehicle side toward the preceding vehicle side in the display region, and the plural inter-vehicle marker objects are sequential emphasis displayed toward the preceding vehicle side. This enables awareness to be given of the preceding vehicle at a position in front of the plural inter-vehicle marker objects, and enables the driving seat occupant to intuitively ascertain this information related to the preceding vehicle.

Furthermore, even in cases in which the preceding vehicle in the view ahead falls outside the display region, the display format of the image displayed in the display region (i.e. display of the image including the plural inter-vehicle marker objects from the host vehicle side toward the preceding vehicle side) is not changed, and so there is no need to determine whether or not the preceding vehicle falls outside the display region, resulting in simple display control.

Note that reference here to "causing display toward the preceding vehicle side" is not limited to a configuration displaying toward the preceding vehicle as viewed through a windshield glass, and is a concept that includes a configuration to cause display toward an image of the preceding vehicle displayed on a display unit or the like inside the vehicle cabin.

A vehicle display control device according to a second aspect of the present disclosure is a vehicle display control device to control a vehicle display device for displaying an image in a display region so as to be superimposed on a portion of a view ahead of a vehicle. The vehicle display control device includes a preceding vehicle detection section, an ACC control detection section, and a display control section. The preceding vehicle detection section is configured to detect a preceding vehicle traveling at a vehicle front side of a host vehicle. The ACC control detection section is configured to detect whether or not the host vehicle is being controlled by adaptive cruise control, and also to detect whether or not the preceding vehicle is a control object for following-travel control of the host vehicle in cases in which the preceding vehicle has been detected by the preceding vehicle detection section. The display control section is configured to, in cases in which the preceding vehicle has been detected by the preceding vehicle detection section and also the host vehicle has been detected as being controlled by adaptive cruise control by the ACC control detection section, to cause an image that includes plural inter-vehicle marker objects from the host vehicle side toward the preceding vehicle side to be displayed in the display region, and in addition to cause sequential emphasis display of the plural inter-vehicle marker objects in sequence from the host vehicle side toward the preceding vehicle side in cases in which the preceding vehicle is a control object for following-travel control of the host vehicle.

In the vehicle display control device of the present disclosure, a preceding vehicle is detected with the preceding vehicle detection section, and the image including plural inter-vehicle marker objects is displayed from the host vehicle side toward the preceding vehicle side in the display region when the host vehicle is being controlled by adaptive cruise control (hereafter referred to as "ACC control"). This enables the driving seat occupant to confirm that ACC control (constant speed cruise control) is being performed.

In cases in which the preceding vehicle is a control object for following-travel control of the host vehicle while under ACC control, sequential emphasis display is performed on the plural inter-vehicle marker objects displayed in the display region sequentially from the host vehicle side toward the preceding vehicle side. This thereby enables a driving seat occupant to confirm intuitively that following-travel control is being performed.

Namely, the driving seat occupant can be made aware that constant speed cruise control is being performed while under ACC control by displaying the image including the plural inter-vehicle marker objects in the display region during constant speed cruise control while under ACC control. The driving seat occupant can also be intuitively made aware that following-travel control is in action by causing sequential emphasis display of the plural inter-vehicle marker objects displayed in the display region during following-travel control.

Moreover, even in cases in which the preceding vehicle in the view ahead falls outside the display region, the image including the plural inter-vehicle marker objects is still displayed from the host vehicle side toward the preceding vehicle side in the display region, and the plural inter-vehicle marker objects are sequential emphasis displayed toward the preceding vehicle side. This enables awareness to be given of a preceding vehicle positioned in front of the plural inter-vehicle marker objects, and enables the driving seat occupant to intuitively ascertain this information related to the preceding vehicle.

Furthermore, even in cases in which the preceding vehicle in the view ahead falls outside the display region, the display format of the image displayed in the display region (i.e. display of the image including the plural inter-vehicle marker objects from the host vehicle side toward the preceding vehicle side) is not changed, and so there is no need to determine whether or not the preceding vehicle falls outside the display region, resulting in simple display control.

Note that reference here to "causing display toward the preceding vehicle side" is not limited to a configuration displaying toward the preceding vehicle as viewed through a windshield glass, and is a concept that includes a configuration to cause display toward an image of the preceding vehicle displayed on a display unit or the like inside the vehicle cabin.

A vehicle display control device according to a third aspect of the present disclosure is the configuration of the first aspect of the second aspect, further including an image generation section configured to generate an image including plural inter-vehicle marker objects from the host vehicle as far as the preceding vehicle in cases in which the preceding vehicle has been detected by the preceding vehicle detection section. In this aspect the display control section is configured to cause plural of the inter-vehicle marker objects capable of display in the display region from out of the image generated by the image generation section to be displayed in the display region.

In this vehicle display control device of the present disclosure, the image including plural inter-vehicle marker objects from the host vehicle as far as the preceding vehicle is generated by the image generation section in cases in which the preceding vehicle has been detected by the preceding vehicle detection section, or in cases in which the preceding vehicle is a control object for following-travel control of the host vehicle. Namely, by generating the image including the plural inter-vehicle marker objects from the host vehicle as far as the preceding vehicle using the image generation section, plural inter-vehicle marker objects are displayed by the display control section from the host vehicle as far as the preceding vehicle in cases in which the preceding vehicle is positioned in the display region, and plural of the inter-vehicle marker objects capable of display in the display region are displayed from the host vehicle side toward the preceding vehicle side in cases in which the preceding vehicle falls outside the display region. In both cases in which the preceding vehicle is in the display region and in which the preceding vehicle falls outside the display region, display control is accordingly simplified simply by the display control section displaying in the display region an image or portion of image produced in a similar display format by the image generation section.

A vehicle display control device according to a fourth aspect of the present disclosure is the configuration of any one of the first aspect to the third aspect, further including a vehicle lane recognition section configured to recognize a position and direction of a vehicle lane in which the host vehicle is traveling. In this aspect the display control section is configured to cause a pair of vehicle lane guide lines indicating two edges of the vehicle lane from the host vehicle side as far as the preceding vehicle side along the vehicle lane recognized by the vehicle lane recognition section to be displayed in the display region.

In the vehicle display control device of the present disclosure, the display control section causes the pair of vehicle lane guide lines indicating the two edges of the vehicle lane in which the host vehicle is traveling to be displayed in the display region from the host vehicle side toward the preceding vehicle. The driving seat occupant is accordingly able to infer the position (direction) of the preceding vehicle from the pair of vehicle lane guide lines displayed in the display region even in cases in which the preceding vehicle falls outside the display region.

A vehicle display control device according to a fifth aspect of the present disclosure is the configuration of any one of the first aspect to the fourth aspect, wherein the display control section is configured so as to cause the plural inter-vehicle marker objects to be displayed in the display region so as to appear as being at a uniform spacing in a vehicle front-rear direction.

In the vehicle display control device of the present disclosure, the display control section displays the plural inter-vehicle marker objects in the display region so as to appear as being at the uniform spacing in the vehicle front-rear direction when the image displayed in the display region is viewed by the driving seat occupant. This enables the driving seat occupant to infer the distance to the preceding vehicle from the number of the inter-vehicle marker object displayed and the like.

The vehicle display control device according to a sixth aspect of the present disclosure is the configuration of the fifth aspect, wherein the display control section is configured so as to perform emphasis display of each of the inter-vehicle marker objects at respective fixed periods of time in cases in which the plural inter-vehicle marker objects are sequential emphasis displayed from the host vehicle side to the preceding vehicle side.

In the vehicle display control device of the present disclosure, the display control section emphasis displays the plural inter-vehicle marker objects displayed so as to appear as being at the uniform spacing in the display region sequentially at respective fixed periods of time from the host vehicle side toward the preceding vehicle side on. Namely, the emphasis displayed inter-vehicle marker objects are seen by the driving seat occupant as moving at a constant speed upward (toward the preceding vehicle side). Thus a gaze of the driving seat occupant seeing the inter-vehicle marker objects displayed in the display region is naturally guided to the preceding vehicle side, enabling the driving seat occupant to be see the preceding vehicle.

A vehicle display control device according to a seventh aspect of the present disclosure is the configuration of any one of the first aspect to the sixth aspect, wherein the display control section performs sequential emphasis display processing at intervals of a specific time period on the plural inter-vehicle marker objects displayed in the display region.

In this vehicle display control device of the present disclosure, the display control section performs processing to cause sequential emphasis display of the plural inter-vehicle marker objects displayed from the host vehicle side toward the preceding vehicle side in the display region (hereafter referred to as "sequential emphasis display processing"), and then performs the next session of sequential emphasis display processing after a specific time period has elapsed.

Were the sequential emphasis display processing to be performed continuously in the display region, then this would be annoying to the driving seat occupant. Thus by performing the sequential emphasis display processing at intervals of a specific time period, the driving seat occupant can continue to be intuitively made aware of the presence of the preceding vehicle or that following-travel control is in action, while preventing the driving seat occupant from being annoyed.

A vehicle display control device according to an eighth aspect of the present disclosure is the configuration of any one of the first aspect to the seventh aspect, wherein the display control section is configured to perform gradation mask application processing to portions corresponding to two vehicle width direction edges of an image being displayed in the display region using a gradation mask having a transmittance that gradually falls on progression from a vehicle width direction inside toward a vehicle width direction outside, and to cause the image that has been subjected to the gradation mask application processing to be displayed in the display region.

In this vehicle display control device of the present disclosure, the display control section performs the gradation mask application processing to the image at portions corresponding to the two vehicle width direction edges of the display region from out of the image displayed in the display region with the gradation mask having a transmittance that gradually falls on progression from the vehicle width direction inside toward the vehicle width direction outside, and causes the image that has been subjected to the gradation processing to be displayed in the display region.

The image displayed in the display region is thereby made gradually darker toward the two vehicle width direction edge sides, such that the displayed image appears to the driving seat occupant to fade out naturally. Namely, the image displayed in the display region appears natural to the driving seat occupant.

A vehicle display control device according to a ninth aspect of the present disclosure is the configuration of any one of the first aspect to the eighth aspect, wherein the display region is a projection surface projected onto by a head up display device at a vehicle front side of a driving seat.

In this vehicle display control device of the present disclosure, the display region is the projection surface projected onto by the head up display device at the vehicle front side of the driving seat, and so an image (the plural inter-vehicle marker objects) are displayed so as to be superimposed on the view ahead as viewed from the driving seat. This accordingly enables the driving seat occupant to confirm the presence of the preceding vehicle without their gaze shifting greatly.

A vehicle display device according to a tenth aspect of the present disclosure includes a display section provided inside a vehicle cabin of the vehicle and including the display region, and also includes the vehicle display control device according to any one of the first aspect to the ninth aspect.

The vehicle display device of the present disclosure includes the display section provided inside the vehicle cabin and including the display region, and the vehicle display control device. The vehicle display control device is able to exhibit the operation and advantageous effects described above due to including the vehicle display control device according to any aspect of the first aspect to the ninth aspect of the present disclosure.

A vehicle display control method according to an eleventh aspect of the present disclosure is a vehicle display control method for causing an image to be displayed in a display region so as to be superimposed on a portion of a view ahead of a vehicle. The vehicle display control method includes detecting a preceding vehicle traveling at a vehicle front side of a host vehicle, and, in cases in which the preceding vehicle has been detected, causing an image including plural inter-vehicle marker objects to be displayed from the host vehicle side toward the preceding vehicle side in the display region, and also causing sequential emphasis display of the plural inter-vehicle marker objects in sequence from the host vehicle side toward the preceding vehicle side.

In the vehicle display control method according to the present disclosure, as described above, the occupant is able to intuitively be made aware of the preceding vehicle, and also display control is simplified simply by displaying the image including the plural inter-vehicle marker objects in the display region in a similar display format in both cases in which the preceding vehicle is at a position in the display region and at a position falling outside the display region.

A vehicle display control method according to a twelfth aspect of the present disclosure is a vehicle display control method for displaying an image in a display region so as to be superimposed on a portion of a view ahead of a vehicle. The vehicle display control method includes detecting a preceding vehicle traveling at a vehicle front side of a host vehicle, detecting whether or not the host vehicle is being controlled by adaptive cruise control, and also detecting whether or not the preceding vehicle is a control object for following-travel control of the host vehicle in cases in which the preceding vehicle has been detected, and, in cases in which the preceding vehicle has been detected and also the host vehicle has been detected as being controlled by adaptive cruise control, causing an image that includes plural inter-vehicle marker objects from the host vehicle side toward the preceding vehicle side to be displayed in the display region, and in addition causing sequential emphasis display of the plural inter-vehicle marker objects in sequence from the host vehicle side toward the preceding vehicle side in cases in which the preceding vehicle is a control object for following-travel control of the host vehicle.

This vehicle display control method according to the present disclosure, as stated above, enables the occupant to be made aware of constant speed cruise control while under ACC control, and the occupant to also be made intuitively aware of following-travel control. Moreover, display control is simplified simply by displaying the image including the plural inter-vehicle marker objects in the display region in a similar display format in both cases in which the preceding vehicle is at a position in the display region and at a position falling outside the display region.

A vehicle display control program according to a thirteenth aspect of the present disclosure is a vehicle display control program for causing an image to be displayed in a display region so as to be superimposed on a portion of a view ahead of a vehicle. The vehicle display control program causes a computer to execute processing including detecting a preceding vehicle traveling at a vehicle front side of a host vehicle, and, in cases in which the preceding vehicle has been detected, causing an image including plural inter-vehicle marker objects to be displayed from the host vehicle side toward the preceding vehicle side in the display region, and also causing sequential emphasis display of the plural inter-vehicle marker objects in sequence from the host vehicle side toward the preceding vehicle side.

This vehicle display control program according to the present disclosure, as stated above, enables the occupant to be intuitively made aware of the preceding vehicle, and also display control is simplified simply by displaying the image including the plural inter-vehicle marker objects in the display region in a similar display format in both cases in which the preceding vehicle is at a position in the display region and at a position falling outside the display region.

A vehicle display control program according to a fourteenth aspect of the present disclosure is a vehicle display control program for causing an image to be displayed in a display region so as to be superimposed on a portion of a view ahead of a vehicle. The vehicle display control program causes a computer to execute processing including detecting a preceding vehicle traveling at a vehicle front side of a host vehicle, detecting whether or not the host vehicle is being controlled by adaptive cruise control, and also detecting whether or not the preceding vehicle is a control object for following-travel control of the host vehicle in cases in which the preceding vehicle has been detected, and, in cases in which the preceding vehicle has been detected and also the host vehicle has been detected as being controlled by adaptive cruise control, causing an image that includes plural inter-vehicle marker objects from the host vehicle side toward the preceding vehicle side to be displayed in the display region, and in addition causing sequential emphasis display of the plural inter-vehicle marker objects in sequence from the host vehicle side toward the preceding vehicle side in cases in which the preceding vehicle is a control object for following-travel control of the host vehicle.

This vehicle display control program according to the present disclosure, as stated above, enables the occupant to be intuitively made aware of constant speed cruise control while under ACC control and also the occupant to be intuitively made aware of following-travel control. Moreover, display control is simplified simply by displaying the image including the plural inter-vehicle marker objects in the display region in a similar display format in both cases in which the preceding vehicle is at a position in the display region and at a position falling outside the display region.

As described above, the vehicle display control device, vehicle display device, vehicle display control method, and vehicle display control program according to the present disclosure enable an image to be displayed in a display region that facilitates intuitive confirmation of information related to a preceding vehicle by a driving seat occupant using simple display control, irrespective of whether or not the preceding vehicle is at a position in the display region.

BRIEF DESCRIPTION OF THE DRAWINGS

Exemplary embodiments of the present invention will be described in detail based on the following figures, wherein:

FIG. 3 is a block diagram illustrating a functional configuration of a vehicle display device according to an exemplary embodiment;

FIG. 4A is a diagram in which an image of a generated projection image is schematically displayed in a virtual image depiction region when no preceding vehicle has been detected during constant speed cruise control while under ACC control;

FIG. 4B is a diagram of a state in which a projection image is schematically displayed so as to be superimposed on a view ahead of a vehicle by being projected onto a third display section when no preceding vehicle has been detected during constant speed cruise control while under ACC control;

FIG. 5A is a diagram in which an image of a generated projection image is schematically displayed in a virtual image depiction region when a preceding vehicle has been detected during constant speed cruise control while under ACC control;

FIG. 6A is a diagram in which an image of a generated projection image is schematically displayed in a virtual image depiction region during following-travel control while under ACC control;

FIG. 6B is a diagram schematically illustrating a state in which a projection image is displayed so as to be superimposed on a view ahead of a vehicle by being projected onto a third display section during following-travel control while under ACC control;

FIG. 7A is a diagram in which an image of a generated projection image is schematically displayed in a virtual image depiction region when a preceding vehicle has been detected during constant speed cruise control while under ACC control;

FIG. 8A is a diagram in which an image of a generated projection image is schematically displayed in a virtual image depiction region during following-travel control while under ACC control;

FIG. 9 is a flowchart illustrating display control while under ACC control of a vehicle display device according to an exemplary embodiment;

FIG. 11 is an explanatory diagram to explain masking processing with respect to an image displayed on a third display section.

DETAILED DESCRIPTION

Exemplary Embodiment

Explanation follows regarding a vehicle 12 applied with a vehicle display device 10 according to an exemplary embodiment, with reference to the drawings. Note that arrow UP in FIG. 1 indicates an upper side in the vehicle height direction, and arrow RH indicates a vehicle width direction right side. Moreover, reference to the height direction and the left-right direction respectively means up/down in the vehicle height direction, and left/right in the vehicle width direction.

Figure 1:
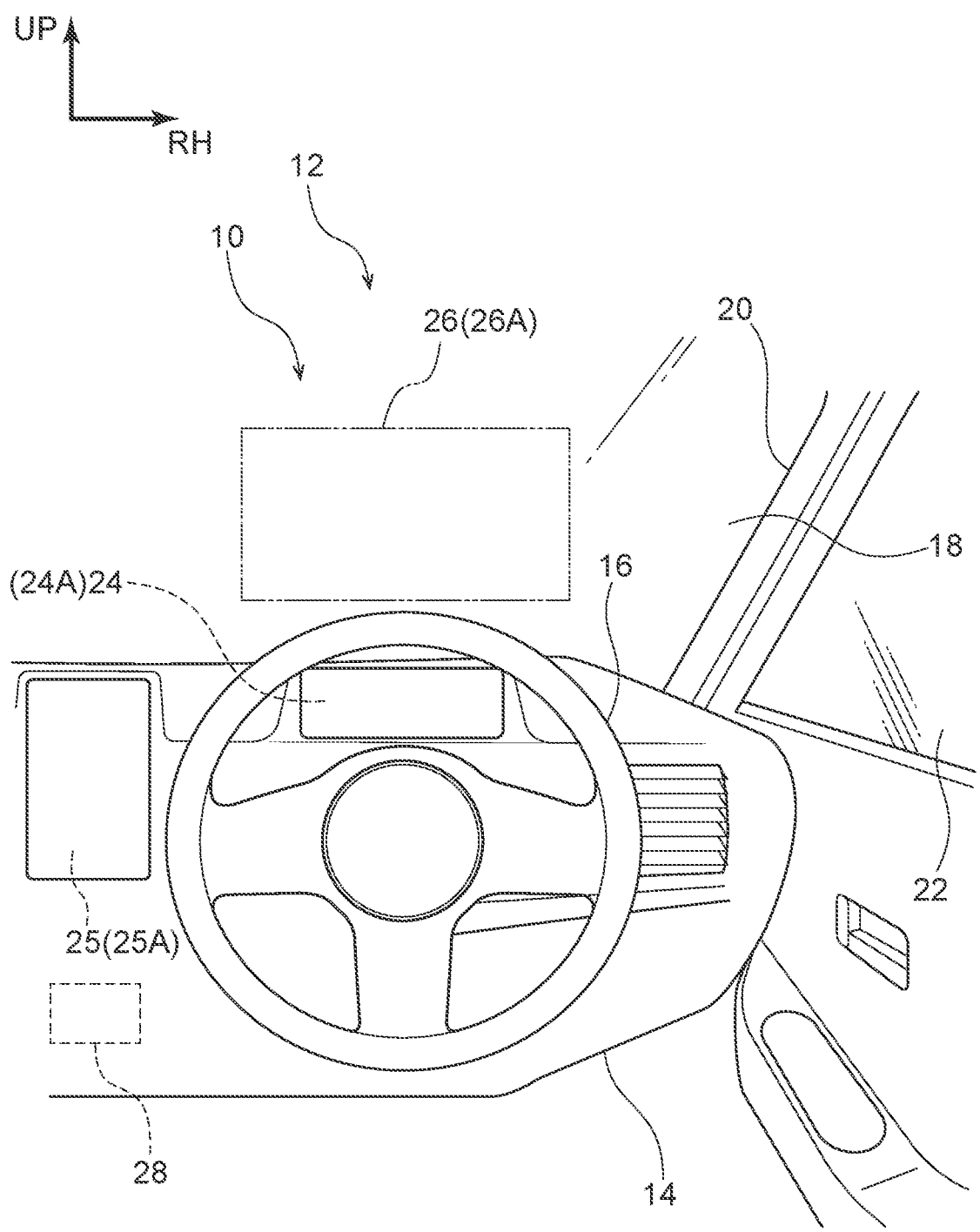
FIG. 1 is a schematic diagram of a front section of a vehicle cabin inside a vehicle applied with the vehicle display device according to an exemplary embodiment, as viewed from a vehicle rear side.

As illustrated in FIG. 1, an instrument panel 14 is provided to a front section of a vehicle cabin inside of the vehicle 12, extending in the vehicle width direction. A steering wheel 16 is provided on a vehicle right side of the instrument panel 14. Namely, in the present exemplary embodiment the vehicle 12 is a right-hand drive vehicle with the steering wheel 16 provided on the right, and with a driving seat provided on the vehicle right side. A windshield glass 18 is provided at a front edge of the instrument panel 14. The windshield glass 18 is installed at the vehicle front side of the driving seat so as to extend in both the vehicle height direction and the vehicle width direction. A vehicle cabin interior and a vehicle cabin exterior is partitioned by the windshield glass 18.

A vehicle right front pillar 20 is fixed to a vehicle right edge of the windshield glass 18. The front pillar 20 extends along the vehicle height direction, and the windshield glass 18 is fixed to a vehicle width direction inside edge thereof. A front edge of a front side glass 22 is fixed to a vehicle width direction outside edge of the windshield glass 18. Note that a vehicle left edge of the windshield glass 18 is fixed to a non-illustrated vehicle left front pillar.

A first display section 24 including an image display region 24A is provided to the instrument panel 14. The first display section 24 is configured by a meter display provided at the vehicle front side of the driving seat at a vehicle width direction right hand side section of the instrument panel 14. The first display section 24 is connected to various instruments installed to the vehicle 12, and is provided at a position within view of the driving seat occupant in a state in which the driving seat occupant is gazing in the vehicle forward direction.

A second display section 25 including an image display region 25A is provided to the instrument panel 14. The second display section 25 is configured by a center display unit arranged at a vehicle width direction center portion of the instrument panel 14.

A third display section 26 including an image display region 26A is provided to the windshield glass 18. The third display section 26 is set at a vehicle upper side of the first display section 24, and the image display region 26A is configured by a projection surface projected onto by a head up display device 44 (see FIG. 2). Specifically, the head up display device 44 is provided further to the vehicle front side than the instrument panel 14, and is configured by a picture being projected from the head up display device 44 onto the image display region 26A of the third display section 26 of the windshield glass 18. Namely, the third display section 26 is configured by a portion of the windshield glass 18 that serves as the projection surface for the head up display device 44.

Vehicle Display Device Hardware Configuration

Figure 2:
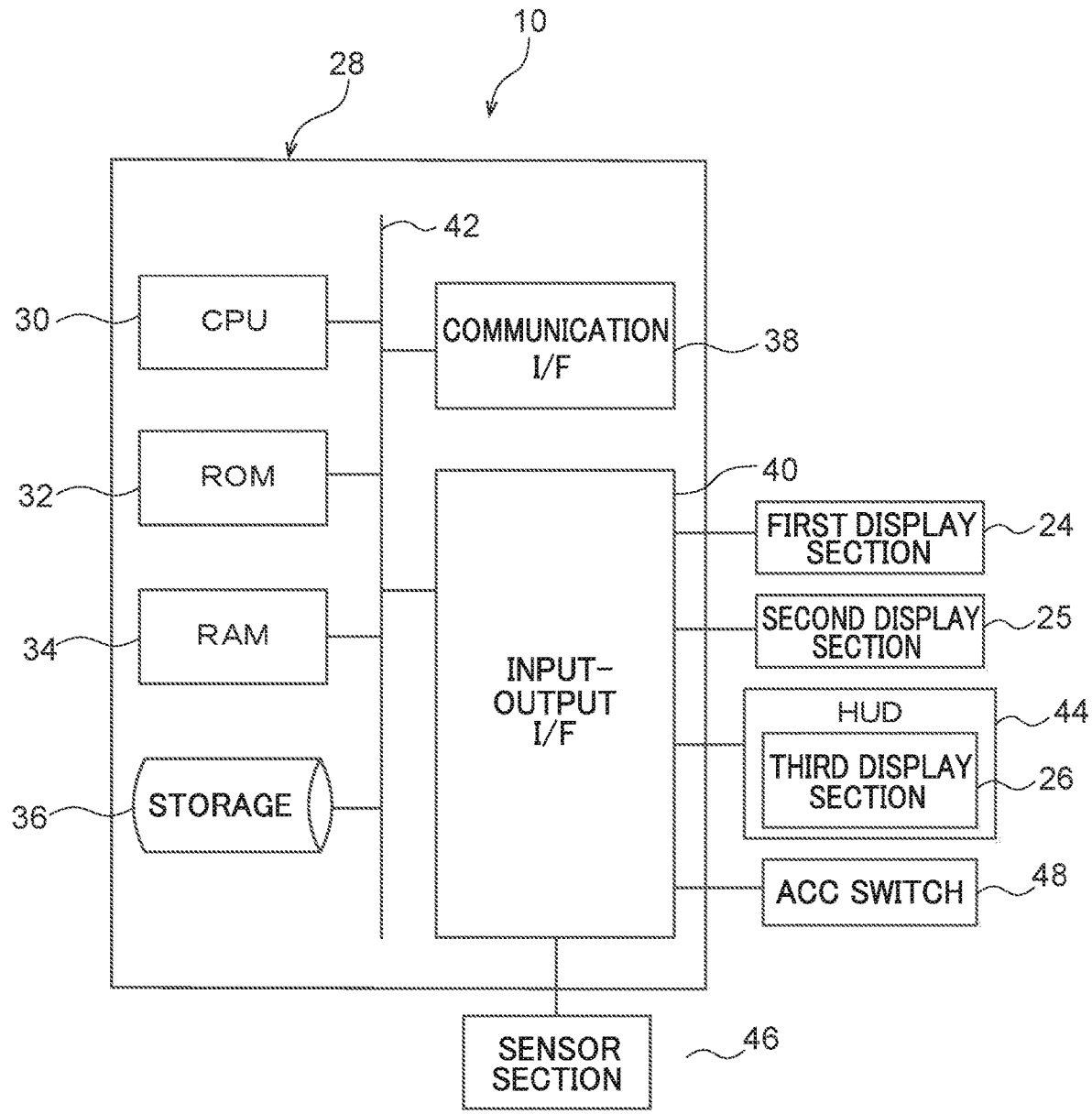
FIG. 2 is a block diagram illustrating a hardware configuration of the vehicle display device according to an exemplary embodiment.

A hardware configuration of the vehicle display device 10 is illustrated in FIG. 2.

An electronic control unit (ECU) 28 is provided in the vehicle 12. As illustrated in FIG. 2, the ECU 28 of the vehicle display device 10 is configured including a central processing unit (CPU: processor) 30, read only memory (ROM) 32, random access memory (RAM) 34, storage 36, a communication interface (communication I/F) 38, and an input-output interface (input-output I/F) 40. These configuration sections are connected together through a bus 42 so as to be able to communicate with each other.

Note that the ECU 28 corresponds to a "vehicle display control device".

The CPU 30 is a central processing unit that executes various programs and controls other sections. Namely, the CPU 30 serves as a processor that reads a program from either the ROM 32 serving as memory of from the storage 36 serving as memory, and executes the program using the RAM 34 as workspace. The CPU 30 controls the configuration described above and performs various computational processing according to the program stored in the ROM 32 or the storage 36.

The ROM 32 stores various programs and various data. The RAM 34 serves as a workspace to temporarily store programs or data. The storage 36 is configured by a hard disc drive (HDD) or a solid state drive (SSD) and stores various programs including an operating system and various data. In the present exemplary embodiment a program and various data and the like for performing display processing are stored in the ROM 32 or the storage 36.

The communication I/F 38 is an interface for communication with a non-illustrated server and other equipment of the vehicle display device 10 and, for example, employs a standard such as Ethernet (registered trademark), LTE, FDDI, Wi-Fi (registered trademark), or the like.

The first display section 24, the second display section 25, the head up display device (HUD) 44, a sensor section 46, and an ACC switch 48 are connected to the input-output I/F 40. An image is projected onto the third display section 26 by the head up display device 44.

Plural sensors are included in the sensor section 46 from out of camera, radar, light detection and ranging/laser imaging detection and ranging (LIDAR), and global positioning system (GPS) sensors. The camera images the surroundings of the vehicle 12. The camera of the present exemplary embodiment is configured including at least a front camera to image in the vehicle forward direction.

The radar uses electromagnetic waves to detect distance and direction to objects in the surroundings of the vehicle 12. The LIDAR uses a laser beam to detect distance and direction to objects in the surroundings of the vehicle 12. Note that in the present exemplary embodiment the radar and LIDAR are equipped with a signal processing section (not illustrated in the drawings) including a function to process detection results for objects in the surroundings. Based on relative positions and changes in relative speeds etc. to individual objects included in a most recent plural number of times of detection results, the signal processing section removes noise and non-moving objects such as roadside objects like guardrails, and performs track-monitoring of moving objects such as pedestrians, other vehicles, and the like. The sensor section 46 is configured so as to also include other sensors and the like for detecting the gaze of occupants.

The ACC switch 48 (omitted from illustration in FIG. 1) is a switch for transitioning the travel state of the vehicle 12 to an adaptive cruise control (ACC) control state, or for releasing the ACC control state under operation by the driving seat occupant. The ECU 28 detects whether or not the vehicle 12 is being ACC controlled by an ACC control ON signal or an ACC control OFF signal being input to the ECU 28 from the ACC switch 48.

Note that ACC control is control such that the vehicle is constant speed cruise controlled to a speed set by the vehicle occupant, and is also following-travel control such that the vehicle follows a preceding vehicle in cases in which the preceding vehicle is present within a specific distance in front of the vehicle.

ECU 28 Functional Configuration

The ECU 28 implements various functions by utilizing the above hardware resources. Explanation follows regarding the functional configuration implemented by the ECU 28, with reference to FIG. 3.

As illustrated in FIG. 3, the vehicle display device 10 includes functional configuration of an ACC control detection section 50, a preceding vehicle detection section 52, a vehicle lane recognition section 54, an image generation section 56, and a display control section 58. Note that each functional configuration is implemented by the CPU 30 reading a program stored on the ROM 32 or the storage 36, and executing the program.

An ACC control ON signal is input to the ECU 28 from the ACC switch 48 when the ACC switch 48 is switched ON, and the ACC control detection section 50 thereby detects that the vehicle 12 is being ACC controlled. An ACC control OFF signal is input to the ECU 28 from the ACC switch 48 when the ACC switch 48 is switched OFF, and the ACC control detection section 50 thereby detects that ACC control of the vehicle 12 has been halted (is not being executed).

Note that the ECU 28 performs image display control according to the present exemplary embodiment by using the ACC control detection section 50 to detect that ACC control has been started.

Figure 5B:
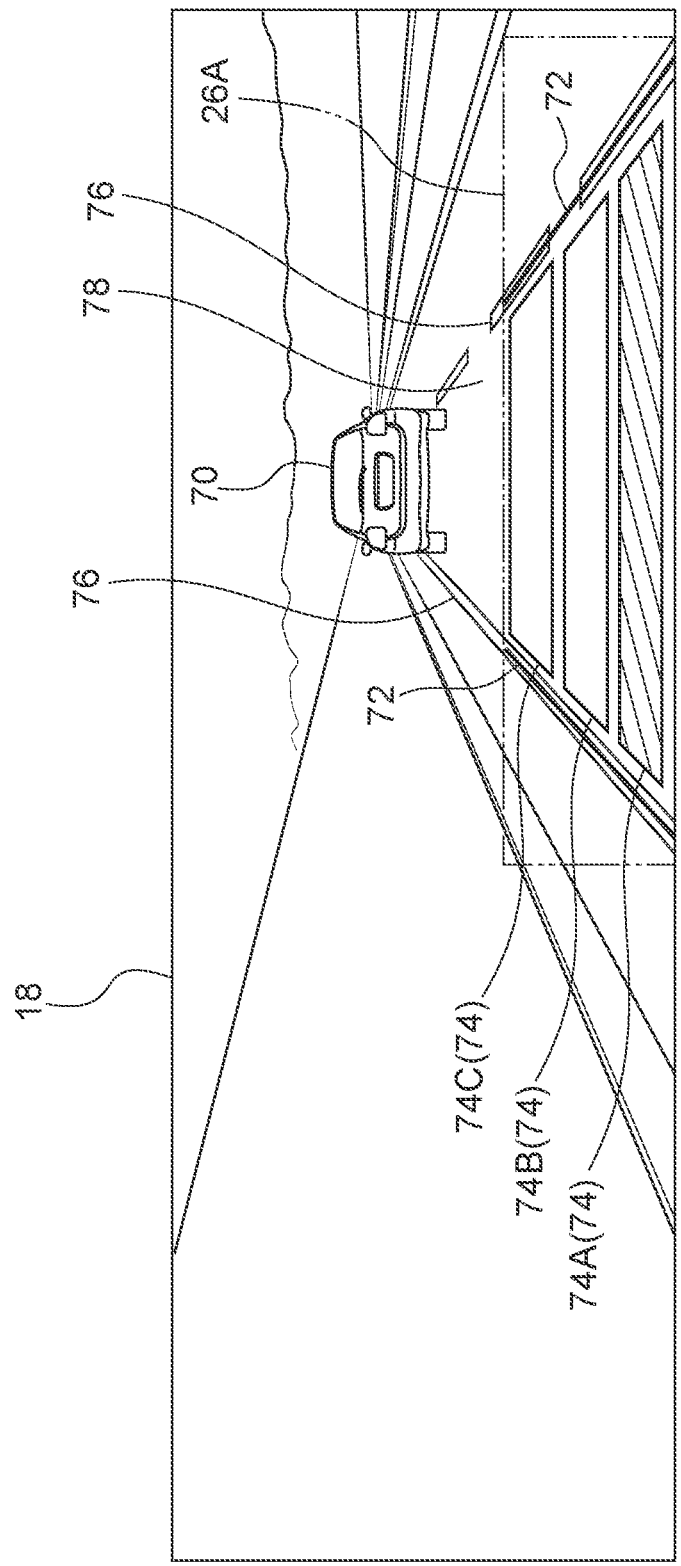
FIG. 5B is a diagram schematically illustrating a state in which a projection image is displayed so as to be superimposed on a view ahead of a vehicle by being projected onto a third display section when a preceding vehicle has been detected during constant speed cruise control while under ACC control.

During ACC control execution the preceding vehicle detection section 52 acquires information relating to a position of a preceding vehicle 70 that is traveling in front of the vehicle 12 and is in the same vehicle lane 78 as the vehicle 12 (see, for example, FIG. 5B). Specifically, the preceding vehicle detection section 52 acquires information about the preceding vehicle 70 detected by the sensor section 46.

The vehicle lane recognition section 54 includes a function to recognize the vehicle lane 78 in which the vehicle 12 is traveling. Specifically, white lines drawn on the road surface are analyzed based on images captured by the camera imaging in front of the vehicle 12, and the vehicle lane 78 is recognized therefrom. Recognition of the vehicle lane 78 includes recognition of the shape of the vehicle lane 78, and recognition of the lane width of the vehicle lane 78.

The image generation section 56 generates an image to display on the third display section 26 serving as the projection surface of the head up display device 44. The image generated by the image generation section 56 includes, for example, various images (not illustrated in the drawings) such as a meter image display indicating the travel speed of the vehicle 12 and the like.

FIG. 4A to FIG. 8A schematically (virtually) illustrate images as seen by the driving seat occupant were an image that was generated in a virtual image depiction region VA by the image generation section 56 to be projected in its entirety onto the windshield glass 18, through the head up display device 44.

In cases in which the preceding vehicle 70 is detected while under ACC control, based on information about the preceding vehicle 70 and information about the vehicle lane 78 in the virtual image depiction region VA the image generation section 56 generates an image of a pair of vehicle lane guide lines 72 illustrating the vehicle lane 78 (both edges thereof) extending from the vehicle 12 to as far as the preceding vehicle 70, as illustrated in FIG. 5A, and also generates an image of plural inter-vehicle marker objects 74 set at specific spacings at positions between the pair of vehicle lane guide lines 72 (along the vehicle lane 78) from the vehicle 12 to the preceding vehicle 70.

Moreover, in cases in which there is no preceding vehicle 70 detected while under ACC control, based on information about the vehicle lane 78 the image generation section 56 produces an image in the virtual image depiction region VA of the pair of vehicle lane guide lines 72 indicating the vehicle lane 78 (both edges thereof) extending from the vehicle 12 for a set distance forward, as illustrated in FIG. 4A, and also produces an image of plural inter-vehicle marker objects 74 respectively formed between the pair of vehicle lane guide lines 72 (along the vehicle lane 78) at each set inter-vehicle distance.

The plural inter-vehicle marker objects 74 referred to are formed with substantially rectangular shapes of either a trapezoidal shape (see FIG. 4A to FIG. 6A) or substantially parallel quadrangle shape (see FIG. 7A, FIG. 8A). Moreover, the plural inter-vehicle marker objects 74 are formed so as to have a uniform spacing for a vehicle front-rear direction spacing on a view ahead when displayed in the image display region 26A of the third display section 26 by the head up display device 44.

Note that the "virtual image depiction region VA" is a virtual region where an image is generated (image data is produced), and is preferably set as a region encompassing at least the preceding vehicle 70 (all of the position thereof) employed as a control object for ACC control, and is set at least as a wider region than the image display region 26A of the third display section 26.

Moreover, FIG. 4A to FIG. 8A schematically illustrate a displayed image under the assumption of being seen through the windshield glass 18 by the driving seat occupant in cases in which all of an image (the pair of vehicle lane guide lines 72 and the plural inter-vehicle marker objects 74) produced in the virtual image depiction region VA is projected onto the projection surface of the windshield glass 18 through the head up display device 44.

The display control section 58 includes a function to cause an image generated by the image generation section 56, or a portion of the image, to be displayed on the third display section 26 through the head up display device 44, and a function to erase an image being displayed on the third display section 26.

The display control section 58, for example, causes various images to be displayed on the image display region 26A of the third display section 26 through the head up display device 44 so as to be fused with the view ahead of the vehicle 12 as seen by the driving seat occupant through the third display section 26 (the windshield glass 18).

Note that due to limitations of a display unit such as an LCD configuring the head up display device 44 and limitations of an optical system, such as a concave mirror and the like, for projecting the image from the LCD etc. onto the windshield glass 18, sometimes only part of the image generated in the virtual image depiction region VA by the image generation section 56 is displayed in the image display region 26A of the third display section 26 (as described in detail later).

In the present exemplary embodiment, in cases in which the preceding vehicle 70 has been detected while under ACC control, the display control section 58 causes plural inter-vehicle marker objects formed at the set distance spacing from the vehicle 12 toward the preceding vehicle 70 to be displayed superimposed on the view ahead.

In such cases, the display control section 58 displays only the portions of the image generated by the image generation section 56 that are portions displayable on the image display region 26A of the third display section 26. Namely, an image from the display unit of the head up display device 44 that is displayed in the image display region 26A of the third display section 26 of the windshield glass 18 through the optical system (concave reflection mirror etc.) is limited to the portion displayed in the image display region 26A of the third display section 26 due to the limitations of the displayable region of the display unit and the limitations of the optical system.

Namely, in cases in which the preceding vehicle 70 is positioned in the image display region 26A of the third display section 26 on the view ahead of the vehicle 12 as seen by the driving seat occupant, the display control section 58 is configured to display on the image display region 26A of the third display section 26 all (plural) of the inter-vehicle marker objects 74 and the vehicle lane guide lines 72 generated from the vehicle 12 toward the preceding vehicle 70 in the virtual image depiction region VA of the image generation section 56 (see, for example, FIG. 6A and FIG. 6B).

However, in cases in which the preceding vehicle 70 falls outside of the image display region 26A of the third display section 26 on the view ahead of the vehicle 12 are seen by the driving seat occupant, the display control section 58 is configured so as to display some of the inter-vehicle marker objects 74 (plural thereof on the vehicle 12 side) from out of the plural inter-vehicle marker objects 74 generated as an image from the vehicle 12 side toward the preceding vehicle 70 side (see, for example, FIG. 5A, FIG. 5B, or FIG. 7A, FIG. 7B, or FIG. 8A, FIG. 8B).

Moreover, in cases in which determination is made that following-travel control is being performed while under ACC control, the display control section 58 executes emphasis display processing of the plural inter-vehicle marker objects 74 displayed in the image display region 26A of the third display section 26 of the windshield glass 18 so as to have high brightness at respective fixed periods of time sequentially from the vehicle 12 side (lower side) toward the preceding vehicle 70 side (upper side) (see, for example, inter-vehicle marker objects 74A in FIG. 5B to FIG. 7B).

Furthermore, an image of only a region capable of being represented on the LCD from out of the image including the plural marker objects formed in the virtual image depiction region is projected from the LCD, and the image is also projected via a concave mirror or the like onto the display region (projection surface) on the windshield glass 18.

Operation

Next, description follows regarding operation of the present exemplary embodiment.

Explanation follows regarding an example of display control to cause an image (such as the inter-vehicle marker objects 74) indicating ACC activation in the ECU 28 to be displayed on the third display section 26, which is the projection surface of the head up display device 44, and display control for emphasis display processing (high brightness processing) of the inter-vehicle marker objects 74, with reference to the flowchart illustrated in FIG. 9. This display control is executed by the CPU 30 reading a vehicle display control program from the ROM 32 or the storage 36, expanding the program in the RAM 34, and executing the program.

The display control of the present exemplary embodiment is executed in cases in which the ACC control is switched ON by the driving seat occupant operating the ACC switch 48.

Namely, using the function of the ACC control detection section 50, the CPU 30 detects ACC control of the vehicle 12 by input of the ACC control ON signal from the ACC switch 48, and starts display control (see FIG. 9 (flowchart)).

Using the function of the preceding vehicle detection section 52, the CPU 30 determines whether or not a preceding vehicle has been detected in front of the vehicle along the vehicle lane 78 of the vehicle 12 based on detection results from the sensor section 46 (see step S10 in FIG. 9 (hereafter abbreviated to "FIG. 9,")).

In cases in which the preceding vehicle has been detected (step S10: YES) the CPU 30 uses the function of the image generation section 56 to generate, in the virtual image depiction region VA, an image on the projection surface of the pair of vehicle lane guide lines 72 indicating both edges of the vehicle lane 78 from the vehicle 12 toward the preceding vehicle 70, and generates an image of the plural inter-vehicle marker objects 74 set so as to appear as being at a uniform spacing along the vehicle lane 78 between the pair of vehicle lane guide lines 72 (see FIG. 5A to FIG. 8A) (see step S12).

However, in cases in which no preceding vehicle was detected (step S10: NO), the CPU 30 uses the function of the image generation section 56 to generate, in the virtual image depiction region VA, an image of the vehicle lane guide lines 72 from the vehicle 12 to a fixed distance forward (for example, 100 m forward) along the vehicle lane 78, and generates an image of the plural inter-vehicle marker objects 74 set so as to appear as being at a uniform spacing along the vehicle lane 78 between the pair of vehicle lane guide lines 72 (see FIG. 4A) (see step S14).

Then in both cases the CPU 30 uses the function of the display control section 58 to display an image including the inter-vehicle marker objects 74 and the vehicle lane guide lines 72 on the image display region 26A of the third display section 26 using the head up display device 44 based on the images generated by the function of the image generation section 56 (see step S16).

However, when this is performed, the vehicle lane guide lines 72 and the inter-vehicle marker objects 74 are displayed more faintly than other images being displayed (such as a vehicle speed display image or the like (not illustrated in the drawings)).

Thereby the driving seat occupant is able to see the vehicle lane guide lines 72 and the plural inter-vehicle marker objects 74 superimposed on the view ahead visible through the windshield glass 18.

For example, in cases in which the preceding vehicle 70 has been detected, for example as illustrated in FIG. 5B to FIG. 8B, the pair of vehicle lane guide lines 72 and the plural inter-vehicle marker objects 74 are displayed so as to be superimposed on the view ahead in the third display section 26.

Figure 7B:
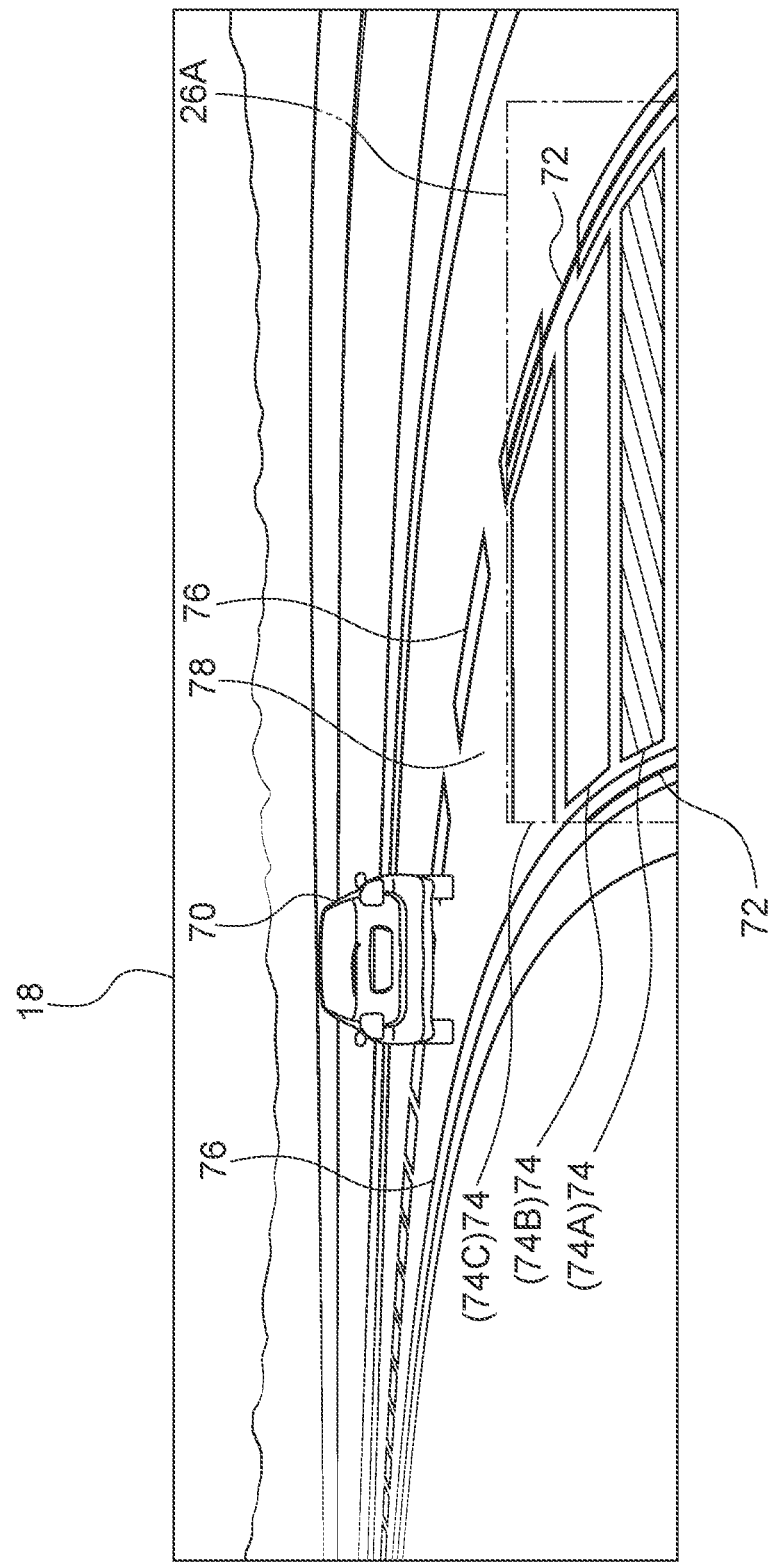
FIG. 7B is a diagram schematically illustrating a state in which a projection image is displayed so as to be superimposed on a view ahead of a vehicle by being projected onto a third display section while under ACC control.
Figure 8B:
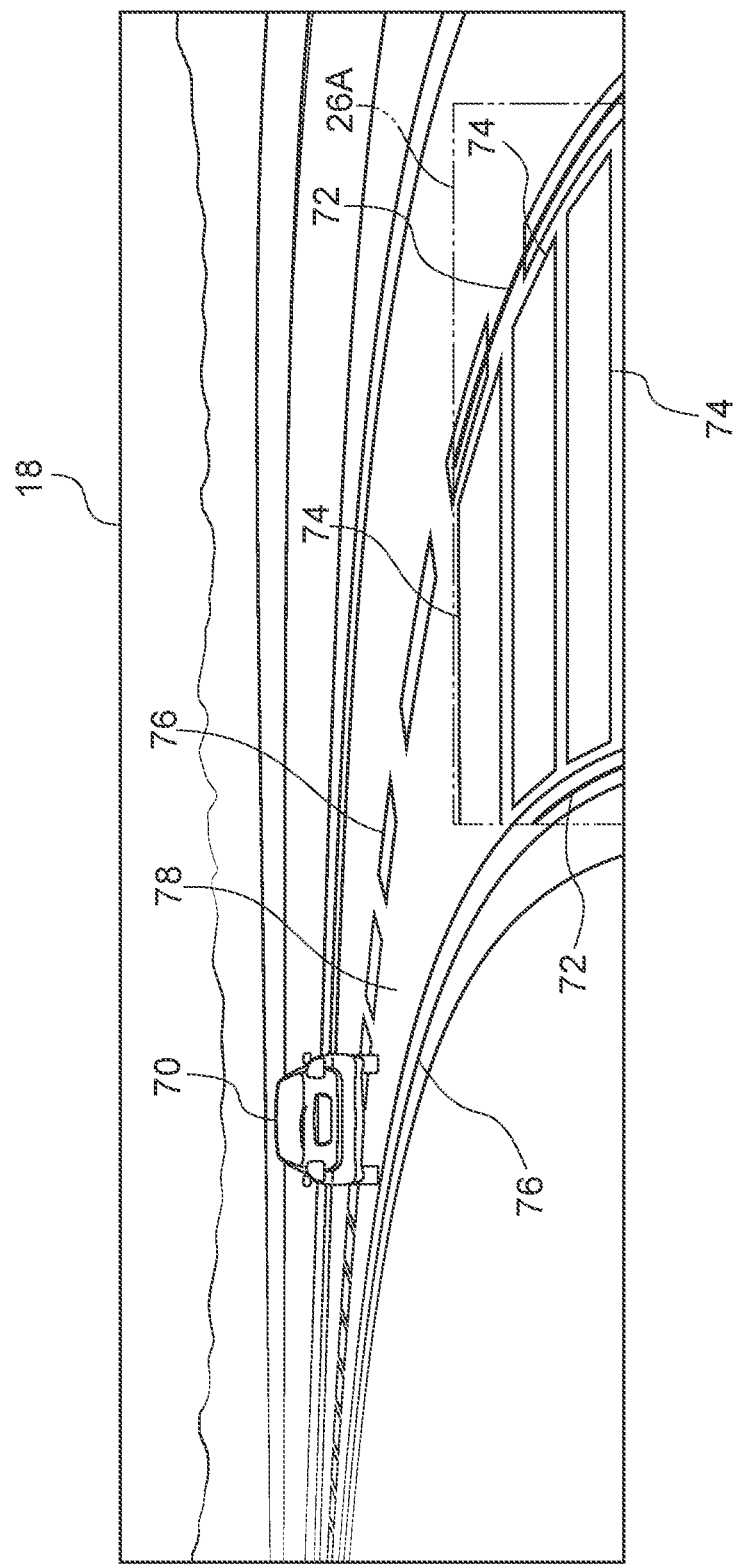
FIG. 8B is a diagram schematically illustrating a state in which a projection image is displayed so as to be superimposed on a view ahead of a vehicle by being projected onto a third display section during following-travel control while under ACC control.

As illustrated in FIG. 5B, FIG. 7B, FIG. 8B, when the preceding vehicle 70 as seen by the driving seat occupant falls outside the third display section 26, although only some portions of the pair of vehicle lane guide lines 72 and the inter-vehicle marker objects 74 generated by the image generation section 56 are displayed, due to the position/direction of the preceding vehicle 70 being suggested by the display of the vehicle lane guide lines 72 and the inter-vehicle marker objects 74, confirmation that ACC control is being executed can be made intuitively, and the preceding vehicle 70 is easily confirmed.

However, in cases in which no preceding vehicle 70 has been detected, an image including the pair of vehicle lane guide lines 72 extending to a fixed distance forward from the vehicle 12 and including the plural inter-vehicle marker objects 74 formed between the pair of vehicle lane guide lines 72 is projected onto the image display region 26A of the third display section 26 of the windshield glass 18.

As a result, the pair of vehicle lane guide lines 72 and the plural inter-vehicle marker objects 74 configuring a portion of the image generated by the image generation section 56 are displayed in the image display region 26A of the third display section 26 (see FIG. 4B).

In this manner, irrespective of whether or not the preceding vehicle 70 has been detected, the plural inter-vehicle marker objects 74 and the pair of vehicle lane guide lines 72 are displayed in the image display region 26A of the third display section 26 in both cases, enabling driving seat occupant to be intuitively be made aware that ACC control is in operation.

The CPU 30 then uses the ACC control detection section 50 to determine whether or not the ACC control is continuing (step S18).

In cases in which the ACC control is continuing (step S18: YES), the CPU 30 continues to determine whether or not to the preceding vehicle 70 is being locked onto as a control object (step S22).

Specifically, determination is made as to whether or not the preceding vehicle 70 is as close at a specific distance along the vehicle lane 78 from the vehicle 12 or closer. The ACC control is switched from constant speed cruise control to following-travel control in cases in which the preceding vehicle 70 is as close in the vehicle lane 78 as the specific distance from the vehicle 12 or closer. Namely, the preceding vehicle 70 is locked onto as a control object for following-travel control.

In cases in which the preceding vehicle 70 is not locked onto as a control object for following-travel control (step S22: NO), the CPU 30 returns to step S18.

However, in cases in which the preceding vehicle 70 has been locked onto as the control object for following-travel control (step S22: YES), the CPU 30 performs emphasis display processing (high brightness processing) to raise the brightness of the plural inter-vehicle marker objects 74 displayed on the third display section 26 for respective fixed periods of time by performing the processing sequentially from the vehicle 12 side (lower side) toward the preceding vehicle 70 side (upper side) (step S24). For example, in the case illustrated in FIG. 8B, the emphasis display processing (high brightness processing) is performed for a respective fixed period of time for inter-vehicle marker objects 74A, 74B, 74C, sequentially from the inter-vehicle marker object 74A at the vehicle 12 side (lower side) to the inter-vehicle marker object 74C at the preceding vehicle side (upper side).

The driving seat occupant is accordingly able to confirm that the inter-vehicle marker objects 74 are being brightened in sequence from below (the vehicle 12 side) toward above (the preceding vehicle 70 side) by the plural inter-vehicle marker objects 74 on the third display section 26 being fixed period of time emphasis displayed (at high brightness for a fixed period of time) in sequence from below, i.e. the vehicle 12 side (lower side), toward above, i.e. the preceding vehicle 70 side (upper side). This enables the driving seat occupant to intuitively be made aware that following-travel control is being executed.

Note that, as illustrated in FIG. 6B, as long as the preceding vehicle 70 (i.e. part of the rear tires) is positioned inside the third display section 26, that following-travel control is being performed with the preceding vehicle 70 as the control object is easily recognized by the inter-vehicle marker objects 74 being of high brightness sequentially toward the preceding vehicle 70 (in the sequence inter-vehicle marker objects 74A, 74B, 74C).

However, as illustrated in FIG. 5B and FIG. 7B, even in cases in which the preceding vehicle 70 falls outside the third display section 26, due to the pair of vehicle lane guide lines 72 and the plural inter-vehicle marker objects 74 in the image display region 26A of the third display section 26 being depicted as directed toward the preceding vehicle 70, from the high brightness processing the driving seat occupant is able to be intuitively made aware that following-travel control is being performed.

Moreover, due to the pair of vehicle lane guide lines 72 and the plural inter-vehicle marker objects 74 being displayed along the vehicle lane 78 toward the preceding vehicle 70, the gaze of the driving seat occupant is guided thereby, enabling the preceding vehicle 70 to be easily seen as the control object for following-travel control.

However, in cases in which, at step S18, the ACC control OFF signal is input to the ECU 28 from the ACC switch 48 due to the driving seat occupant switching the ACC switch 48 OFF, the CPU 30 determines that the ACC control has ended (step S18: NO).

In such cases the CPU 30 halts projection of the image by the head up display device 44 onto the third display section 26, and the display image disappears from the image display region 26A of the third display section 26 (step S20).

In other words, disappearance of the vehicle lane guide lines 72 and the inter-vehicle marker objects 74 from the image display region 26A of the third display section 26 enables the driving seat occupant to be made aware of (confirm) that the ACC control has ended.

Advantageous Effects

In this manner, in the display control of the vehicle display device 10 according to the present exemplary embodiment, when ACC control is being executed the pair of vehicle lane guide lines 72 and the plural inter-vehicle marker objects 74 are displayed on the third display section 26 irrespective of whether or not the preceding vehicle 70 has been detected (see FIG. 4B to FIG. 8B). The driving seat occupant is thereby able to confirm intuitively that the ACC control is being executed merely by seeing the pair of vehicle lane guide lines 72 and the plural inter-vehicle marker objects 74 and irrespective of the presence of absence of the preceding vehicle 70.

In particular, because the sequential high brightness processing is performed on the plural inter-vehicle marker objects 74 during following-travel control while under ACC control, the driving seat occupant is able to confirm that constant speed cruise control is being executed due to a state being displayed in which the high brightness processing is not performed, as illustrated in FIG. 8B.

Moreover, in the vehicle display device 10, in cases in which the preceding vehicle 70 is the control object while under ACC control (i.e. during following-travel control), as illustrated in FIG. 5B to FIG. 7B, due to the plural inter-vehicle marker objects 74 being displayed on the third display section 26 having the sequential high brightness processing performed thereon from the vehicle 12 side (lower side) toward the preceding vehicle 70 side (upper side), the driving seat occupant is able to confirm intuitively that following-travel control is being performed.

In particular, in cases in which the preceding vehicle 70 (a portion thereof) in the view ahead of the vehicle 12 is positioned in the image display region 26A of the third display section 26, the plural inter-vehicle marker objects 74 are displayed all the way to the preceding vehicle 70, as illustrated in FIG. 6B, enabling the driving seat occupant to easily confirm that the preceding vehicle 70 is the control object for following-travel control.

On the other hand, in cases in which the preceding vehicle 70 in the view ahead of the vehicle 12 falls outside the image display region 26A of the third display section 26, the plural inter-vehicle marker objects 74 are arranged along the vehicle lane 78 from the vehicle 12 side toward the preceding vehicle 70 side, as illustrated in FIG. 5B, FIG. 7B, and the sequential high brightness processing is performed thereon toward the preceding vehicle 70 side. The gaze of the driving seat occupant is thereby guided to the preceding vehicle 70 serving as the control object for following-travel control, enabling the preceding vehicle 70 to be confirmed.

Furthermore, while under ACC control of the vehicle 12, the vehicle display device 10 generates, in the virtual image depiction region VA, the plural inter-vehicle marker objects 74 from the vehicle 12 to the preceding vehicle 70 (see FIG. 5A to FIG. 8A), and all or some of the plural inter-vehicle marker objects 74 are displayed in the image display region 26A of the third display section 26. Namely, there is no change to the format of images generated in the virtual image depiction region VA between when the preceding vehicle 70 in the view ahead of the vehicle 12 is positioned inside the image display region 26A of the third display section 26, and when the preceding vehicle 70 falls outside the image display region 26A of the third display section 26. In other words, in the display control there is no need to determine whether or not the preceding vehicle 70 in the view ahead of the vehicle 12 is positioned inside the image display region 26A of the third display section 26, thereby simplifying display control.

Moreover, during constant speed cruise control while under ACC control, the vehicle display device 10 displays other images being displayed by the head up display device 44 in the image display region 26A of the third display section 26, such as a speed display or the like, more faintly, thereby suppressing deterioration of visibility of the view ahead by the driving seat occupant.

Furthermore, the plural inter-vehicle marker objects 74 displayed in the image display region 26A of the third display section 26 are displayed at uniform spacings, and sequential high brightness processing is performed thereon for respective fixed periods of time from the vehicle 12 side (lower side) toward the preceding vehicle 70 side, such that the high brightness inter-vehicle marker object 74 appears to the driving seat occupant to be moving to the preceding vehicle 70 side at a uniform speed. The gaze of the driving seat occupant is accordingly even more easily guided to the preceding vehicle 70.

Furthermore, in the vehicle display device 10, after one session of sequential high brightness processing is performed on the plural inter-vehicle marker objects 74 displayed in the image display region 26A of the third display section 26 during following-travel control while under ACC control, the next session of sequential high brightness processing is performed after a specific period of time has elapsed.

By performing the sequential high brightness processing intermittently in this manner, the driving seat occupant is able to intuitively be made aware that the following-travel control is being performed while preventing the driving seat occupant being annoyed by the high brightness processing.

Versions

Figure 10:
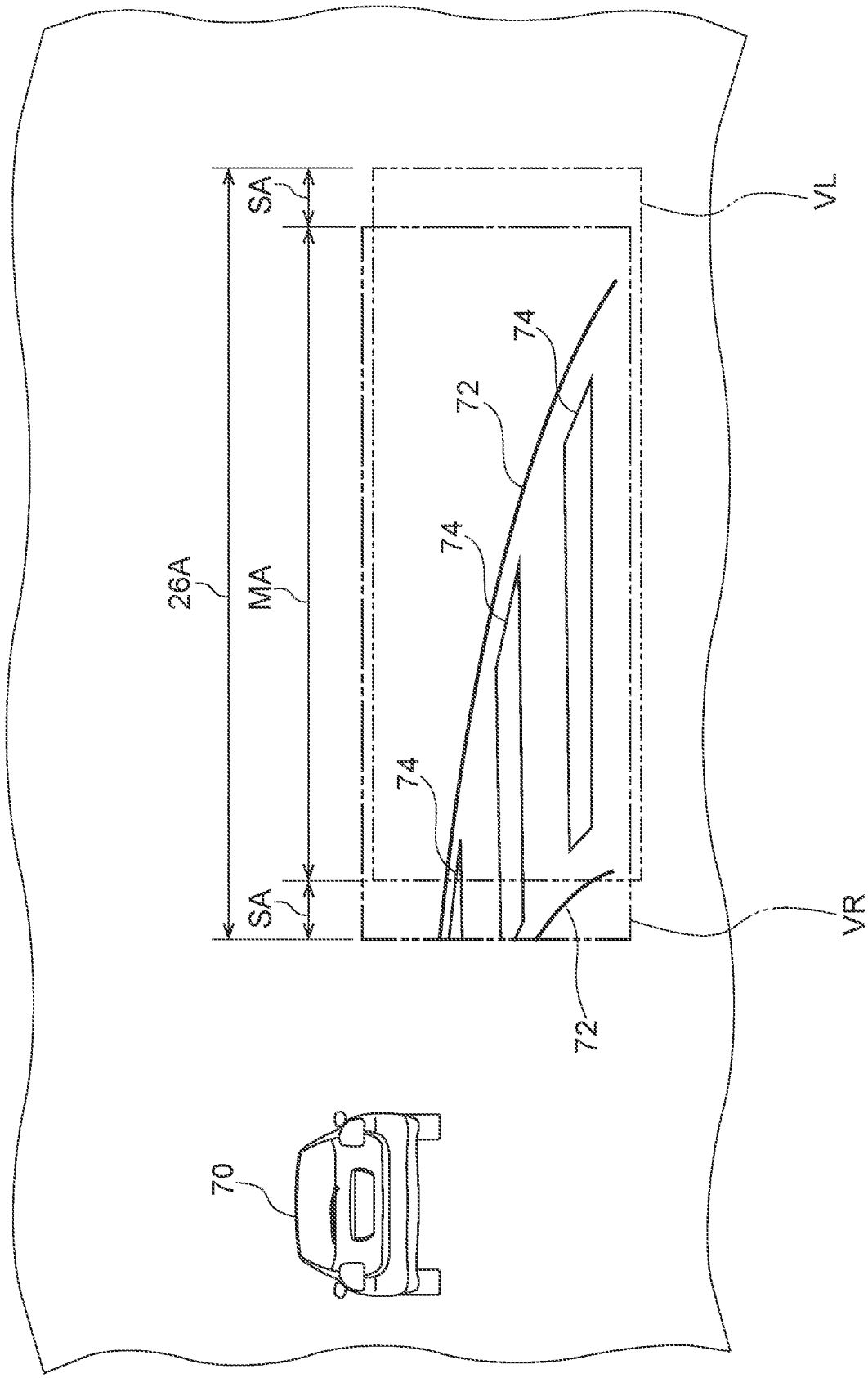
FIG. 10 is a diagram to explain a view of an occupant in the driving seat with respect to an image displayed on a third display section superimposed on a view ahead.

Note that, as illustrated in FIG. 10, in cases in which the two vehicle width direction edges of the projection image being displayed in the third display section 26 are not limited by the display unit of the head up display device 44 but are limited by the optical system, a right eye view VR of the driving seat occupant is different from a left eye view VL in the image display region 26A of the third display section 26. Note that in FIG. 10, although the right eye view VR and the left eye view VL are illustrated offset in the height direction, this is done so as to avoid lines of each view overlapping with each other, and in reality there is no offset in the height direction therebetween.

Due to the right eye view VR and the left eye view VL of the driving seat occupant differing in this manner, the image display region 26A may be divided into a two-eye visual area MA viewed with both eyes toward the vehicle width direction center, and single-eye visual areas SA viewed with a single eye at the respective two vehicle width direction edges.

As a result, to the driving seat occupant the image projected by the head up display device 44 onto the third display section 26 (the vehicle lane guide lines 72 and the plural inter-vehicle marker objects 74) appears relatively bright in the two-eye visual area MA, and appears relatively dark at the single-eye visual areas SA at the two vehicle width direction edges. Thus the vehicle lane guide lines 72 and the inter-vehicle marker objects 74 projected onto the image display region 26A of the third display section 26 appear darker at the two edges than toward the center, so that the edges appear to naturally fade out.

However, in cases in which there is a desire to make the way in which the two edges of the image projected onto the image display region 26A of the third display section 26 appear to the driving seat occupant to fade out more naturally, or in cases in which limitations at the two vehicle width direction edges of the image display region 26A of the third display section 26 are not due to the optical system but due to the display unit, then a mask may conceivably be set by the image generation section 56.

Specifically, as illustrated in FIG. 11, in the virtual image depiction region VA masks 80 having a transmittance of 0% are set at portions corresponding to the two vehicle width direction edges at the outside of the image display region 26A of the third display section 26, and also gradual transmittance change masks 82 (i.e. masks applied with a gradation) that change gradually from transmittance of 100% to 0% on progression from the vehicle width direction inside toward the vehicle width direction outside are set at portions corresponding to the vehicle width direction inside of the mask 80 (the two vehicle width direction edges of the image display region 26A).

By doing so, in the image display region 26A of the third display section 26, due to the portions where the gradual transmittance change masks 82 are set at the two vehicle width direction edges of the displayed image gradually becoming darker (fading out) toward the vehicle width direction outside, the image (the vehicle lane guide lines 72 and the plural inter-vehicle marker objects 74) projected by the head up display device 44 appears even more natural to the driving seat occupant.

Note that the reason that the mask setting is setting only at the two vehicle width direction edges of the image display region 26A, and that there is no setting at the two height direction edges thereof, is that there is a height adjustment function in the head up display device 44 for accommodating seating heights and the like of the driving seat occupant (changes in the view point). Namely, in order to adjust the image display region 26A in the height direction using the height adjustment function, there would be a need to also move the position of the mask in the height direction. The display control would accordingly be too complicated, and so no masks are set at the portions corresponding to the height direction edges of the image display region 26A.

Moreover, in order to accommodate height adjustments as described above, a height direction width of the masks is set longer than the height direction width of the image display region 26A, as illustrated in FIG. 11.

Other

Although in the present exemplary embodiment a case is described in which the image display region 26A of the third display section 26 onto which the image from the head up display device 44 is projected is on the windshield glass 18, application may be made to cases in which an image is formed on the image display region 24A of the first display section 24 or the image display region 25A of the second display section 25. In such cases, the preceding vehicle 70 displayed by the image is on the image display region 24A of the first display section 24 or is on the image display region 25A of the second display section 25, however similar operation and advantageous effects are exhibited to those of the present exemplary embodiment.

In particular, even in cases in which an icon or the like indicating the preceding vehicle 70 falls outside (is not displayed in) the image display region 24A of the first display section 24 or the image display region 25A of the second display section 25, the driving seat occupant can be intuitively made aware that following-travel control is in action due to the sequential emphasis control described above.

Although in the present exemplary embodiment the control described above is performed for ACC control, there is no limitation thereto. A vehicle at the vehicle front side of the vehicle 12 may be detected, and application may be made to display of information related to that vehicle on a display section. In such cases display control may be performed that is similar to that during following-travel control while under ACC control. For example, application may be made to front cross traffic alert (FCTA) or the like.

Furthermore, although in the present exemplary embodiment the following-travel control was indicated by the sequential high brightness processing performed on the plural inter-vehicle marker objects 74 displayed in the image display region 26A of the third display section 26, there is no limitation thereto as long as each of the inter-vehicle marker objects 74 can be made to stand out in sequence by sequential emphasis display processing.

Moreover, although explanation has been given of the processing performed in the vehicle display device 10 being software processing performed by executing a program, there is no limitation thereto. For example, the processing may be performed by hardware. Or, the processing may be performed by a combination of both software and hardware. Moreover, in cases in which the processing is performed by software, a program may distributed by being stored on various types of non-transitory storage medium, such as a digital versatile disc (DVD), so as to be executed by a processor such as the CPU 30 or the like.

This completes a description of exemplary embodiments, however obviously various embodiments may be implemented within a range not departing from the spirit of the present disclosure.

What is claimed is:

1. A vehicle display control device, comprising:
   a memory; and
   a processor coupled to the memory, wherein the processor is configured to control a vehicle display device that displays an image at a display region so as to be superimposed on a portion of a view ahead of a host vehicle, the processor being configured to:
   detect a preceding vehicle traveling at a vehicle front side relative to the host vehicle, and
   in a case in which the preceding vehicle has been detected:
      cause an image that includes a plurality of inter-vehicle marker objects from a host vehicle side toward a preceding vehicle side to be displayed at the display region, and
      after the image that includes the plurality of inter-vehicle marker objects is caused to be displayed, implement sequential emphasis display of the plurality of inter-vehicle marker objects in sequence from the host vehicle side toward the preceding vehicle side such that after the inter-vehicle marker object of the plurality of inter-vehicle marker objects that is closest to the host vehicle is emphasized with respect to the remaining inter-vehicle marker objects, the inter-vehicle marker object of the plurality of inter-vehicle marker objects that is immediately adjacent to the inter-vehicle marker object that is closest to the host vehicle is emphasized with respect to the inter-vehicle marker object that is closest to the host vehicle; or detect a preceding vehicle traveling at a vehicle front side relative to the host vehicle, in a case in which the preceding vehicle has been detected:

detect whether or not the host vehicle is being controlled by adaptive cruise control, and detect whether or not the preceding vehicle is a target for following-travel control of the host vehicle, and in the case in which the preceding vehicle has been detected:

cause an image that includes a plurality of inter-vehicle marker objects from a host vehicle side toward a preceding vehicle side to be displayed at the display region, and in a case in which it has been detected that the host vehicle is being controlled by the adaptive cruise control and the preceding vehicle is the target for the following-travel control of the host vehicle:

after the image that includes the plurality of inter-vehicle marker objects is displayed, implement sequential emphasis display of the plurality of inter-vehicle marker objects in sequence from the host vehicle side toward the preceding vehicle side such that after the inter-vehicle marker object of the plurality of inter-vehicle marker objects that is closest to the host vehicle is emphasized with respect to the remaining inter-vehicle marker objects, the inter-vehicle marker object of the plurality of inter-vehicle marker objects that is immediately adjacent to the inter-vehicle marker object that is closest to the host vehicle is emphasized with respect to the inter-vehicle marker object that is closest to the host vehicle, wherein the processor is configured to perform emphasis display of each of the inter-vehicle marker objects for respective fixed periods of time in the case in which the plurality of inter-vehicle marker objects are subjected to the sequential emphasis display from the host vehicle side to the preceding vehicle side.

2. The vehicle display control device of claim 1, wherein the processor is configured to:

generate an image including a group of inter-vehicle marker objects from the host vehicle as far as the preceding vehicle in the case in which the preceding vehicle has been detected, and cause the plurality of the inter-vehicle marker objects, which are configured for display at the display region from within the generated image, to be displayed at the display region.

3. The vehicle display control device of claim 1, wherein the processor is further configured to:

recognize a position and a direction of a vehicle lane in which the host vehicle is traveling, and cause a pair of vehicle lane guide lines, indicating respective edges of the vehicle lane from the host vehicle side as far as the preceding vehicle side along the vehicle lane, to be displayed at the display region.

4. The vehicle display control device of claim 1, wherein the processor is configured to cause the plurality of inter-vehicle marker objects to be displayed at the display region so as to appear uniformly spaced apart in a vehicle front-rear direction.

5. The vehicle display control device of claim 1, wherein the processor is configured to perform the sequential emphasis display processing, at intervals of a specific time period, on the plurality of inter-vehicle marker objects displayed at the display region.

6. The vehicle display control device of claim 1, wherein the processor is configured to:

perform gradation mask application processing on portions corresponding to respective vehicle width direction edges of an image being displayed at the display region using a gradation mask having a transmittance that gradually decreases in progression from a vehicle width direction inner side toward a vehicle width direction outer side, and cause the image that has been subjected to the gradation mask application processing to be displayed at the display region.

7. The vehicle display control device of claim 1, wherein the display region is a projection surface that is projected onto by a head-up display device at a vehicle front side of a driving seat.

8. A vehicle display device, comprising:

the vehicle display control device of claim 1; and a display section provided inside a vehicle cabin of the host vehicle and including the display region.

9. A vehicle display control method, executed by a processor, for controlling a vehicle display device configured to display an image at a display region so as to be superimposed on a portion of a view ahead of a host vehicle, the vehicle display control method comprising:

detecting a preceding vehicle traveling at a vehicle front side relative to the host vehicle, and in a case in which the preceding vehicle has been detected:

causing an image that includes a plurality of inter-vehicle marker objects from a host vehicle side toward a preceding vehicle side to be displayed at the display region, and after the image that includes the plurality of inter-vehicle marker objects is caused to be displayed, implementing sequential emphasis display of the plurality of inter-vehicle marker objects in sequence from the host vehicle side toward the preceding vehicle side such that after the inter-vehicle marker object of the plurality of inter-vehicle marker objects that is closest to the host vehicle is emphasized with respect to the remaining inter-vehicle marker objects, the inter-vehicle marker object of the plurality of inter-vehicle marker objects that is immediately adjacent to the inter-vehicle marker object that is closest to the host vehicle is emphasized with respect to the inter-vehicle marker objects object that is closest to the host vehicle; or detecting a preceding vehicle traveling at a vehicle front side relative to the host vehicle, in a case in which the preceding vehicle has been detected:

detecting whether or not the host vehicle is being controlled by adaptive cruise control, and detecting whether or not a preceding vehicle is a target for following-travel control of the host vehicle, and in the case in which the preceding vehicle has been detected:
  causing an image that includes a plurality of inter-vehicle marker objects from a host vehicle side toward a preceding vehicle side to be displayed at the display region, and
  in a case in which it has been detected that the host vehicle is being controlled by the adaptive cruise control and the preceding vehicle is the target for the following-travel control of the host vehicle:
    after the image that includes the plurality of inter-vehicle marker objects is displayed, implementing sequential emphasis display of the plurality of inter-vehicle marker objects in sequence from the host vehicle side toward the preceding vehicle side such that after the inter-vehicle marker object of the plurality of inter-vehicle marker objects that is closest to the host vehicle is emphasized with respect to the remaining inter-vehicle marker objects, the inter-vehicle marker object of the plurality of inter-vehicle marker objects that is immediately adjacent to the inter-vehicle marker object that is closest to the host vehicle is emphasized with respect to the inter-vehicle marker objects object that is closest to the host vehicle; and
    performing emphasis display of each of the inter-vehicle marker objects for respective fixed periods of time in the case in which the plurality of inter-vehicle marker objects are subjected to the sequential emphasis display from the host vehicle side to the preceding vehicle side.

10. The vehicle display control method of claim 9, further comprising:
  generating an image including a group of inter-vehicle marker objects from the host vehicle as far as the preceding vehicle in the case in which the preceding vehicle has been detected; and
  causing the plurality of the inter-vehicle marker objects, configured for display at the display region from within the generated image, to be displayed at the display region.

11. The vehicle display control method of claim 9, further comprising:
  recognizing a position and a direction of a vehicle lane in which the host vehicle is traveling; and
  causing a pair of vehicle lane guide lines, indicating respective edges of the vehicle lane from the host vehicle side as far as the preceding vehicle side along the vehicle lane, to be displayed at the display region.

12. The vehicle display control method of claim 9, further comprising:
  causing the plurality of inter-vehicle marker objects to be displayed at the display region so as to appear uniformly spaced apart in a vehicle front-rear direction.

13. A non-transitory storage medium storing a program executable by a processor to perform vehicle display control processing for controlling a vehicle display device configured to display an image at a display region so as to be superimposed on a portion of a view ahead of a host vehicle, the vehicle display control processing comprising:
  detecting a preceding vehicle traveling at a vehicle front side relative to the host vehicle, and
  in a case in which the preceding vehicle has been detected:
    causing an image that includes a plurality of inter-vehicle marker objects from a host vehicle side toward a preceding vehicle side to be displayed at the display region, and
    after the image that includes the plurality of inter-vehicle marker objects is caused to be displayed, implementing sequential emphasis display of the plurality of inter-vehicle marker objects in sequence from the host vehicle side toward the preceding vehicle side such that after the inter-vehicle marker object of the plurality of inter-vehicle marker objects that is closest to the host vehicle is emphasized with respect to the remaining inter-vehicle marker objects, the inter-vehicle marker object of the plurality of inter-vehicle marker objects that is immediately adjacent to the inter-vehicle marker object that is closest to the host vehicle is emphasized with respect to the inter-vehicle marker object that is closest to the host vehicle; or
  detecting a preceding vehicle traveling at a vehicle front side relative to the host vehicle,
  in a case in which the preceding vehicle has been detected:
    detecting whether or not the host vehicle is being controlled by adaptive cruise control, and
    detecting whether or not a preceding vehicle is a target for following-travel control of the host vehicle, and
  in the case in which the preceding vehicle has been detected:
    causing an image that includes a plurality of inter-vehicle marker objects from a host vehicle side toward a preceding vehicle side to be displayed at the display region, and
    in a case in which it has been detected that the host vehicle is being controlled by the adaptive cruise control and the preceding vehicle is the target for the following-travel control of the host vehicle:
      after the image that includes the plurality of inter-vehicle marker objects is displayed, implementing sequential emphasis display of the plurality of inter-vehicle marker objects in sequence from the host vehicle side toward the preceding vehicle side such that after the inter-vehicle marker object of the plurality of inter-vehicle marker objects that is closest to the host vehicle is emphasized with respect to the remaining inter-vehicle marker objects, the inter-vehicle marker object of the plurality of inter-vehicle marker objects that is immediately adjacent to the inter-vehicle marker object that is closest to the host vehicle is emphasized with respect to the inter-vehicle marker object that is closest to the host vehicle; and
    performing emphasis display of each of the inter-vehicle marker objects for respective fixed periods of time in the case in which the plurality of inter-vehicle marker objects are subjected to the sequential emphasis display from the host vehicle side to the preceding vehicle side.

14. The non-transitory storage medium of claim 13, the vehicle display control processing further comprising:
  generating an image including a group of inter-vehicle marker objects from the host vehicle as far as the preceding vehicle in the case in which the preceding vehicle has been detected; and
  causing the plurality of the inter-vehicle marker objects, configured for display at the display region from within the generated image, to be displayed at the display region.

15. The non-transitory storage medium of claim 13, the vehicle display control processing further comprising:
  recognizing a position and a direction of a vehicle lane in which the host vehicle is traveling; and
  causing a pair of vehicle lane guide lines, indicating respective edges of the vehicle lane from the host vehicle side as far as the preceding vehicle side along the vehicle lane, to be displayed at the display region.

16. The non-transitory storage medium of claim 13, the vehicle display control processing further comprising:
  causing the plurality of inter-vehicle marker objects to be displayed at the display region so as to appear uniformly spaced apart in a vehicle front-rear direction.

\* \* \* \* \*